US010134294B2

(12) United States Patent
Feng et al.

(10) Patent No.: US 10,134,294 B2
(45) Date of Patent: Nov. 20, 2018

(54) SYSTEM, APPARATUS, AND METHOD USING ADS-B AND TCAS DATA FOR DETERMINING NAVIGATION SOLUTIONS FOR A VEHICLE

(71) Applicant: The Boeing Company, Chicago, IL (US)

(72) Inventors: Gang Feng, Bellevue, WA (US); Geun I. Kim, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 163 days.

(21) Appl. No.: 15/246,307

(22) Filed: Aug. 24, 2016

(65) Prior Publication Data

US 2018/0061252 A1   Mar. 1, 2018

(51) Int. Cl.
| | |
|---|---|
| *G06F 19/00* | (2018.01) |
| *G08G 5/04* | (2006.01) |
| *G08G 5/00* | (2006.01) |
| *G01S 19/48* | (2010.01) |
| *G01S 5/00* | (2006.01) |
| *G01S 13/87* | (2006.01) |
| *G01S 13/93* | (2006.01) |

(52) U.S. Cl.
CPC ............ *G08G 5/045* (2013.01); *G01S 5/0072* (2013.01); *G01S 13/878* (2013.01); *G01S 19/48* (2013.01); *G08G 5/0008* (2013.01); *G08G 5/0078* (2013.01); *G01S 13/9303* (2013.01)

(58) Field of Classification Search
CPC ...... G08G 5/045; G08G 1/162; G08G 5/0008; G08G 5/0039; G08G 5/0078
USPC ........................................................ 701/1, 120
See application file for complete search history.

(56) References Cited

U.S. PATENT DOCUMENTS

| | | | |
|---|---|---|---|
| 7,372,400 B2 | 5/2008 | Cohen et al. | |
| 8,990,002 B1 | 3/2015 | Leonard | |
| 9,157,744 B2 | 10/2015 | Hardesty et al. | |
| 9,792,613 B2 * | 10/2017 | Gong | G06Q 30/018 |
| 2015/0331099 A1 * | 11/2015 | Wu | G01S 13/876 |
| | | | 342/32 |

* cited by examiner

*Primary Examiner* — Ronnie M Mancho

(57) ABSTRACT

A system using automatic dependent surveillance-broadcast (ADS-B) data and traffic alert and collision avoidance system (TCAS) data for determining navigation solutions for a vehicle is provided. The system has a communal position system (CPS) with a CPS sensor located in the vehicle. The CPS sensor receives ADS-B data and TCAS data from each of one or more proximate vehicles. The system further has a computer system coupled to the CPS. The computer system is configured to perform the steps of: checking the ADS-B data and the TCAS data for data reasonableness; performing data synchronization of the ADS-B data and the TCAS data; and computing a CPS position and a position accuracy based on the ADS-B data and the TCAS data. The navigation solutions include an alternate navigation solution, an independent navigation solution, and a complementary navigation solution.

21 Claims, 11 Drawing Sheets

FIG. 4

SYSTEM, APPARATUS, AND METHOD USING ADS-B AND TCAS DATA FOR DETERMINING NAVIGATION SOLUTIONS FOR A VEHICLE

BACKGROUND

1) Field of the Disclosure

The disclosure relates generally to vehicle navigation and position determination systems, apparatuses, and methods, and more particularly, to air vehicle navigation and position determination systems, apparatuses, and methods, using automatic dependent surveillance-broadcast (ADS-B) data and traffic alert and collision avoidance system (TCAS) data.

2) Description of Related Art

Vehicles, such as air vehicles, in the form of aircraft or unmanned aerial vehicles (UAVs), typically use navigation and position determination systems, apparatuses, and methods to provide information about the position of the air vehicle during flight, and on take-off and landing. Such air vehicles may commonly be equipped with known onboard position sensors, such as inertial reference system (IRS) sensors, global navigation satellite system (GNSS) sensors, including global positioning system (GPS) sensors, and radio position sensors, for example, those using data from DME (distance measuring equipment) and VOR (very high frequency omnidirectional ranging) receivers. Such onboard position sensors may be used to identify an aircraft's position.

However, such known onboard position sensors may be susceptible to operational and reliability issues, such as sensor receivers becoming nonoperational, may be susceptible to disruption, such as loss of sensor signal, and may be susceptible to interference, such as signal jamming. These may occur unintentionally or deliberately, such as due to outside influences. Such operational issues, signal disruption, and signal jamming may result in lost or inaccurate data, in particular, if there are no similar back-up sensors available. Moreover, while GPS systems, which acquire positioning information from satellites, may provide positioning information to an air vehicle almost anywhere, the availability of such satellite-based systems may be limited due to factors such as satellite geometry. In addition, DME and VOR receivers typically require ground stations or ground infrastructure.

Further, when a group of air vehicles, including UAVs, operate in a relatively close range, either to go from one point to another point, or to perform a single task cooperatively, all of the air vehicles in the group typically need to be equipped with known onboard position sensors, such as IRS sensors, GNSS sensors, and radio position sensors, in order to identify the positions of the air vehicles. Equipping and installing such known onboard position sensors into all of the air vehicles in the group may be expensive, time-consuming, and labor intensive.

In addition, air vehicles are commonly equipped with an automatic position broadcast system, such as automatic dependent surveillance-broadcast ("ADS-B") that may broadcast ADS-B information, such as air vehicle identification, position, velocities, and other information to nearby air vehicles. Air vehicles may also be commonly equipped with traffic alert and collision avoidance system (TCAS) for monitoring the airspace around the vehicle and the position of other air vehicles operating nearby the air vehicle. However, known systems, apparatuses, and methods for air vehicle navigation and position determination do not use data from TCAS and ADS-B, such as receiving information, as an independent or alternate air vehicle navigation position solution, or as a complementary air vehicle navigation solution for integration with known onboard position sensors.

Accordingly, there is a need in the art for an improved system, apparatus, and method for using data from ADS-B and TCAS for determining navigation and position solutions in vehicles, such as air vehicles, and that provide advantages over known air vehicle navigation and position systems, apparatuses, and methods.

SUMMARY

This need for an improved system, apparatus, and method for using data from ADS-B and TCAS for determining navigation and position solutions in vehicles, such as air vehicles, is satisfied by this disclosure. As discussed in the below detailed description, embodiments of the improved system, apparatus, and method for using data from ADS-B and TCAS for determining navigation and position solutions in vehicles, such as air vehicles, may provide significant advantages over existing systems, apparatuses, and methods.

In an embodiment of the disclosure, there is provided a system using automatic dependent surveillance-broadcast (ADS-B) data and traffic alert and collision avoidance system (TCAS) data for determining one or more navigation solutions for a vehicle. The system comprises a communal position system (CPS).

The CPS comprises a communal position system (CPS) sensor located in the vehicle. The CPS sensor is configured to receive automatic dependent surveillance-broadcast (ADS-B) data and traffic alert and collision avoidance system (TCAS) data from each of one or more proximate vehicles.

The system further comprises a computer system coupled to the CPS. The computer system is configured to perform the steps of: checking the ADS-B data and the TCAS data for data reasonableness; performing data synchronization of the ADS-B data and the TCAS data; and computing a communal position system (CPS) position and a position accuracy based on the ADS-B data and the TCAS data.

The CPS is used in determining one or more navigation solutions for the vehicle. The one or more navigation solutions comprise one or more of, an alternate navigation solution, an independent navigation solution, and a complementary navigation solution.

In another embodiment of the disclosure, there is provided an apparatus for using automatic dependent surveillance-broadcast (ADS-B) data and traffic alert and collision avoidance system (TCAS) data for determining one or more navigation solutions for a vehicle. The apparatus comprises a communal position system (CPS) sensor located in the vehicle.

The CPS sensor is configured to receive automatic dependent surveillance-broadcast (ADS-B) data and traffic alert and collision avoidance system (TCAS) data from each of one or more proximate vehicles, and the CPS sensor is used to determine one or more navigation solutions for the vehicle. The one or more navigation solutions comprises one or more of, an alternate navigation solution, an independent navigation solution, and a complementary navigation solution.

The CPS sensor is coupled to a computer system configured to perform the steps of: checking the ADS-B data and the TCAS data for data reasonableness; performing data synchronization of the ADS-B data and the TCAS data; and computing a communal position system (CPS) position and a position accuracy based on the ADS-B data and the TCAS data.

In another embodiment of the disclosure, there is provided a computer implemented method for using automatic dependent surveillance-broadcast (ADS-B) data and traffic alert and collision avoidance system (TCAS) data for determining one or more navigation solutions for a vehicle. The method comprises the step of receiving, by a communal position system (CPS) in the vehicle, automatic dependent surveillance-broadcast (ADS-B) data and traffic alert and collision avoidance system (TCAS) data, from each of one or more proximate vehicles.

The method further comprises the step of conducting a data reasonableness check of the ADS-B data and the TCAS data using a computer system coupled to the CPS. The method further comprises the step of rejecting the ADS-B data and the TCAS data, if the data reasonableness check does not pass.

The method further comprises the step of performing, with the computer system, a data synchronization of the ADS-B data and the TCAS data, if the data reasonableness check passes. The data synchronization takes into account a data latency due to a transmission and a computation of the ADS-B data and the TCAS data.

The method further comprises the step of computing, with the computer system, a communal position system (CPS) position and a position accuracy based on the ADS-B data and the TCAS data, and determining one or more navigation solutions for the vehicle. The one or more navigation solutions comprises one or more of, an alternate navigation solution, an independent navigation solution, and a complementary navigation solution.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 4 is an illustration of a functional block diagram of an embodiment of a system of the disclosure in a vehicle;

The figures shown in this disclosure represent various aspects of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
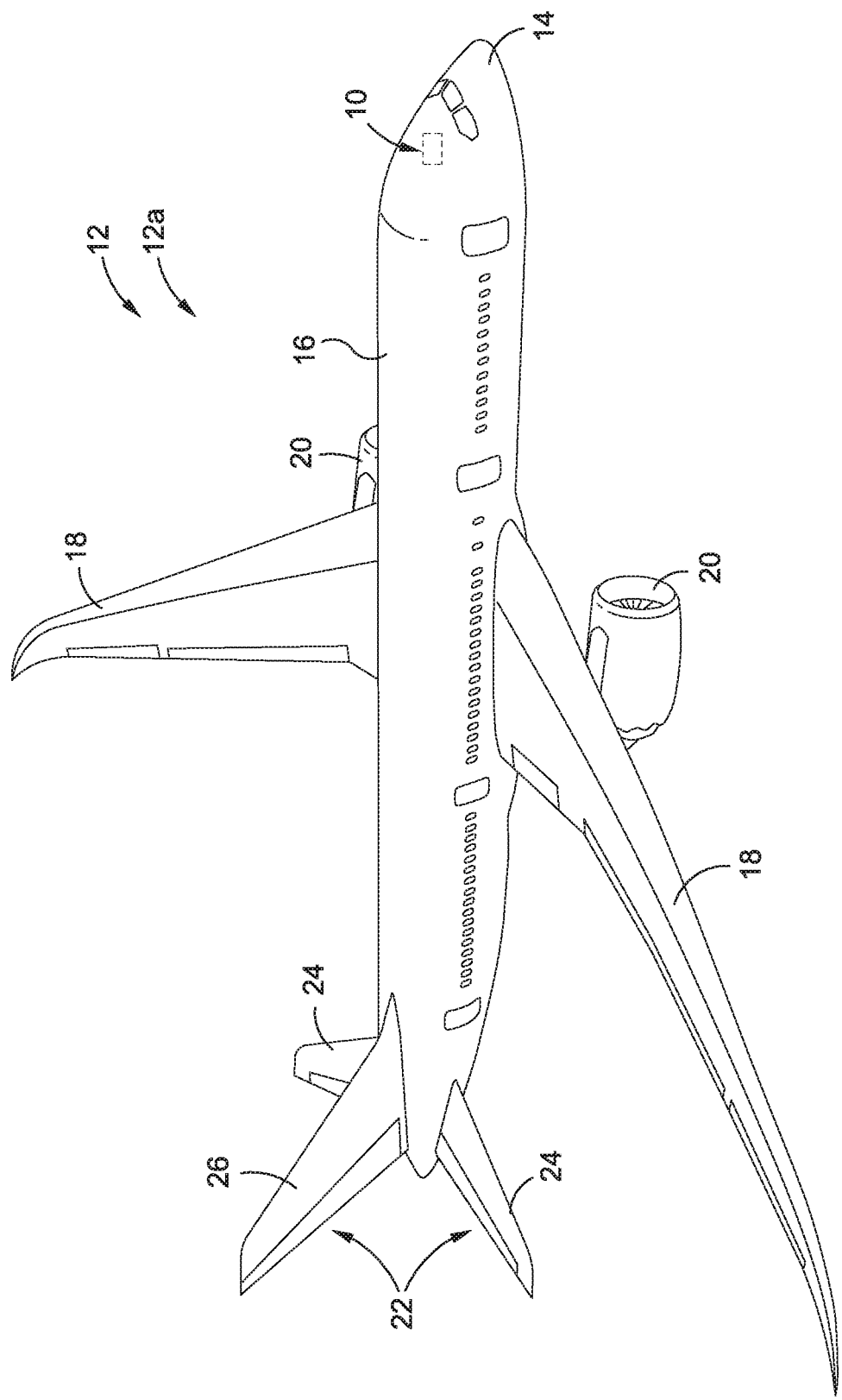
FIG. 1 is a diagrammatic representation of a perspective view of a vehicle that may incorporate an embodiment of a system of the disclosure.

Now referring to the Figures, FIG. 1 is a diagrammatic representation of a perspective view of a vehicle 12, such as in the form of an air vehicle 12a, that may incorporate an embodiment of a system 10 of the disclosure. As further shown in FIG. 1, the vehicle 12, such as in the form of air vehicle 12a, comprises a nose 14, fuselage 16, wings 18, engines 20, and an empennage 22 comprising horizontal stabilizers 24 and a vertical stabilizer 26. The vehicle 12 (see FIGS. 1, 4) may also be in the form of an aircraft 12b (see FIGS. 4), an unmanned air vehicle (UAV) 12c (see FIG. 4), a satellite 12d (see FIG. 4), a glider 12e (see FIG. 4), a rotorcraft 12f (see FIG. 4), a missile 12g (see FIG. 4), or another suitable vehicle.

Figure 2:
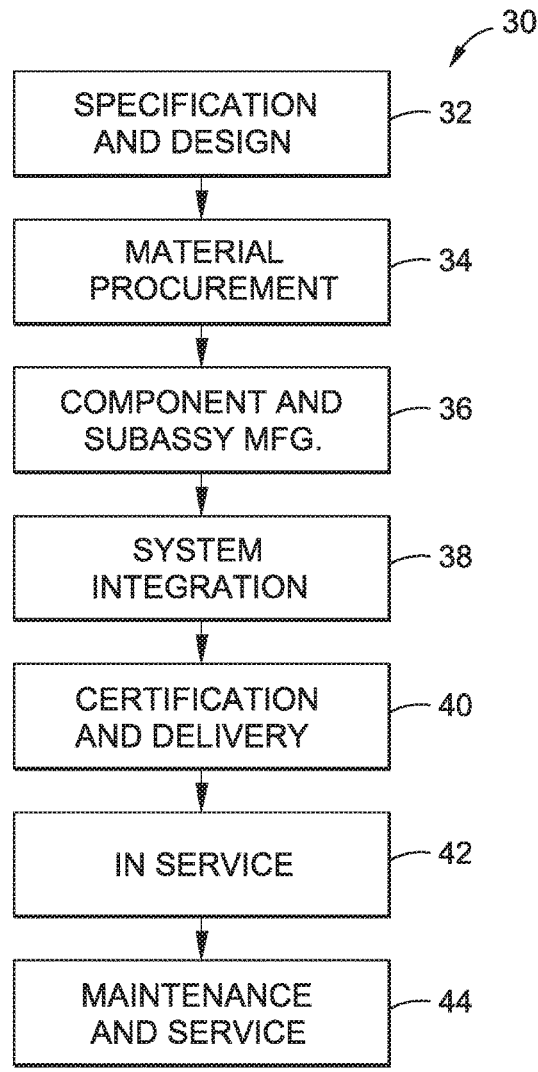
FIG. 2 is a flow diagram of an embodiment of an aircraft manufacturing and service method.
Figure 3:
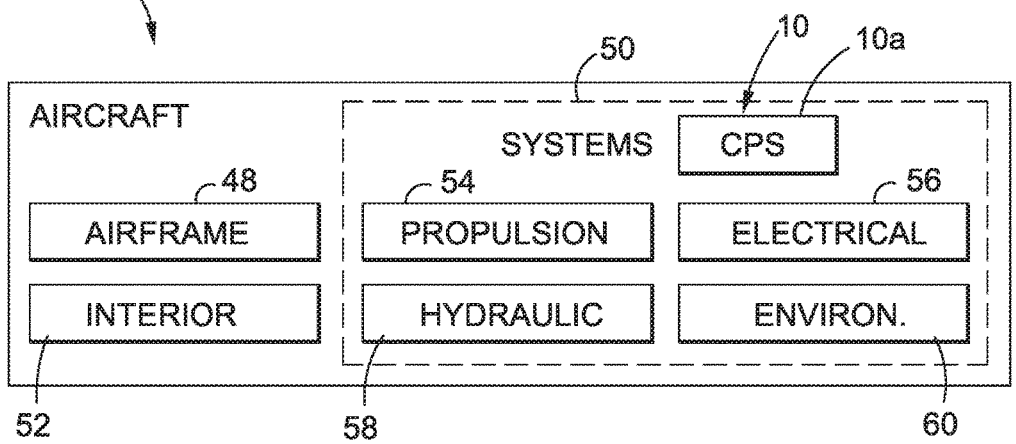
FIG. 3 is an illustration of a functional block diagram of an embodiment of an aircraft.

Now referring to FIGS. 2 and 3, FIG. 2 is a flow diagram of an embodiment of an aircraft manufacturing and service method 30, and FIG. 3 is an illustration of a functional block diagram of an embodiment of an aircraft 46. Referring to FIGS. 2-3, embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 may include an airframe 48 with a plurality of systems 50 and an interior 52. As further shown in FIG. 3, examples of the systems 50 may include one or more of a propulsion system 54, an electrical system 56, a hydraulic system 58, an environmental system 60, and the system 10, such as in the form of communal position system (CPS) 10a, disclosed herein. Any number of other systems may be included. Although an aerospace example is shown, the principles of the disclosure may be applied to other industries, such as the automotive industry, including automotive vehicles, the marine industry, including watercraft, ships, and submarines, and other suitable industries.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to maintenance and service 44 (see FIG. 2).

Figure 4:
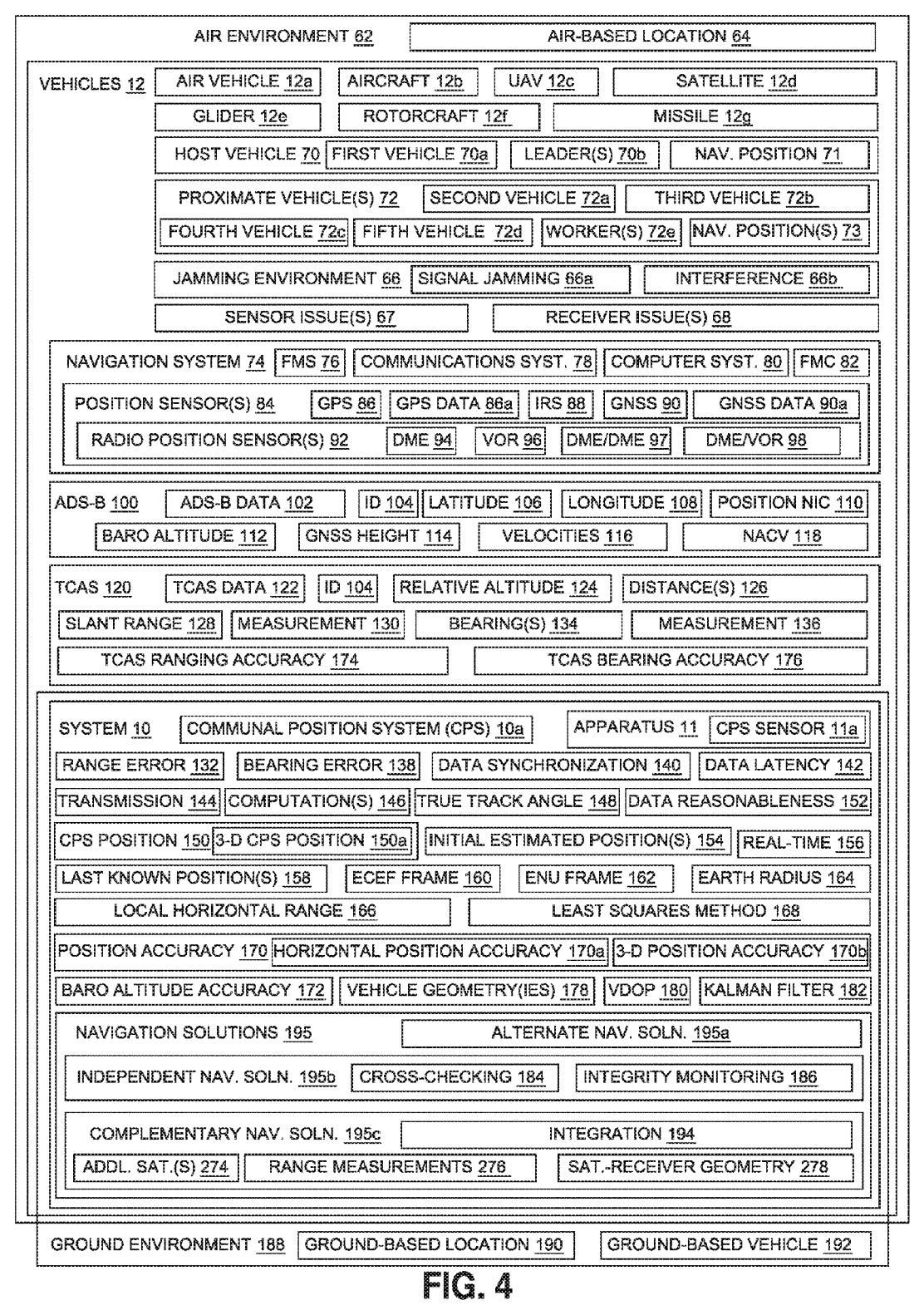

Now referring to FIG. 4, FIG. 4 is an illustration of a functional block diagram of an embodiment of a system 10, such as in the form of communal position system (CPS) 10a, of the disclosure, in the vehicle 12. The system 10, such as in the form of CPS 10a, may be used in an air environment 62, such as in an air-based location 64, for example, in an air vehicle 12a, or may be used in a ground environment 188, such as in a ground-based location 190, for example, in a ground-based vehicle 192. The system 10, such as in the form of CPS 10a, uses automatic dependent surveillance-broadcast (ADS-B) data 102 (see FIG. 4) and traffic alert and collision avoidance system (TCAS) data 122 (see FIG. 4) for determining one or more navigation solutions 195 (see FIG. 4) for the vehicle 12.

The system 10, such as in the form of CPS 10a, comprises an apparatus 11 (see FIG. 4), such as a communal position system (CPS) sensor 11a (see FIG. 4), located in the vehicle 12. The vehicle 12 (see FIG. 4) may comprise a host vehicle 70 (see FIGS. 4, 5), such as a first vehicle 70a (see FIGS. 4, 5), having a navigation position 71 (see FIGS. 4, 5). The vehicle 12 (see FIGS. 4, 6A-6B) may further comprise one or more proximate vehicles 72 (see FIGS. 4, 6A-6B), such as a second vehicle 72a (see FIGS. 4, 6A-6B), a third vehicle 72b (see FIGS. 4, 6A-6B), a fourth vehicle 72c (see FIGS. 4, 6A-6B), and a fifth vehicle 72d (see FIGS. 4, 6B), each having a navigation position 73 (see FIGS. 4, 6A-6B). The vehicle 12, such as the host vehicle 70 and the one or more proximate vehicles 72, may each comprise an aircraft 12b, an unmanned air vehicle 12c, a satellite 12d, a glider 12e, a rotorcraft 12f, a missile 12g, or another suitable vehicle.

The system 10, such as in the form of CPS 10a, with the CPS sensor 11a, may be used when the vehicle 12 (see FIGS. 4-6B) is in a jamming environment 66 (see FIGS. 4-6B), such as experiencing signal jamming 66a (see FIG. 4) or interference 66b (see FIG. 4). The system 10, such as in the form of CPS 10a, with the CPS sensor 11a, may also be used when the vehicle 12 (see FIG. 4) experiences sensor issues 67 (see FIG. 4) such as non-operation, or experiences receiver issues 68 (see FIG. 4).

As shown in FIG. 4, the vehicle 12 comprises a navigation system 74 comprising a flight management system 76, a communications system 78, a computer system 80 (see also FIG. 10), a flight management computer 82, and a plurality of position sensors 92. As further shown in FIG. 4, the plurality of position sensors 92 may comprise a global positioning system (GPS) 86 that outputs GPS data 86a, an inertial reference system (IRS) 88, a global navigation satellite system (GNSS) 90 that outputs GNSS data 90a, and one or more radio position sensors 92 using data from DME (distance measuring equipment) 94 (see FIG. 4) and VOR (very high frequency omnidirectional ranging) 96 (see FIG. 4) receivers. The radio positions may comprise a DME/DME 97 (see FIG. 4) position and a DME/VOR 98 (see FIG. 4) position determined using data from DME 94 (see FIG. 4) and VOR 96 receivers.

The CPS (10a) may be integrated in one of, the FMC 82 (see FIG. 4) in the host vehicle 70, the GPS 86 (see FIG. 4) in the host vehicle 70, the TCAS 120 in the host vehicle (70), or in another suitable integration 194 (see FIG. 4), apparatus, or device.

The system 10, such as in the form of CPS 10a, with the CPS sensor 11a is configured to receive automatic dependent surveillance-broadcast (ADS-B) data 102 from each of the one or more proximate vehicles 72 in proximity to the host vehicle 70, through an automatic dependent surveillance-broadcast (ADS-B) 100 (see FIG. 4), and is configured to receive traffic alert and collision avoidance system (TCAS) data 122 from each of the one or more proximate vehicles 72, through a traffic alert and collision avoidance system (TCAS) 120 (see FIG. 4).

The CPS sensor 11a receives ADS-B data 102 through ADS-B In (input) data from each of the one or more proximate vehicles 72, which each have ADS-B Out (output). As shown in FIG. 4, the ADS-B data 102 for each of the one or more proximate vehicles 72 comprises one or more of, identification information 104 for each proximate vehicle 72, a latitude 106 for each proximate vehicle 72, a longitude 108 for each proximate vehicle 72, a position navigation integrity category (NIC) 110 for each proximate vehicle 72, a barometric altitude 112 for each proximate vehicle 72, a global navigation satellite system (GNSS) height 114 for each proximate vehicle 72, a plurality of velocities 116 for each proximate vehicle 72, and a navigation accuracy category for velocity (NACv) 118 for each proximate vehicle 72. Based on an existing industry specification, the ADS-B data 102 may be received by the host vehicle 70 (see FIGS. 4-6B) at 2 Hz (Hertz) from the one or more proximate vehicles 72 (see FIGS. 4-6B), the barometric altitude 112 may be at a 100 ft (foot) increment, and the plurality of velocities 116 may comprise North/South (N/S), East/West (E/W), and vertical velocities.

The CPS sensor 11a receives TCAS data 122 from each of the one or more proximate vehicles 72. As shown in FIG. 4, the TCAS data 122 for each of the one or more proximate vehicles 72 comprises one or more of, identification information 104 for each proximate vehicle 72, a slant range 128 for each proximate vehicle 72, a bearing 134 for each proximate vehicle 72, and a relative altitude 124 for each proximate vehicle 72. Based on an existing industry specification, the TCAS data 122 may be received by the host vehicle 70 (see FIGS. 4-6B) with an update rate of 1 Hz (Hertz) from the one or more proximate vehicles 72 (see FIGS. 4-6B). The slant range 128 (see FIG. 4) may have a range error 132 (see FIG. 4) of 50 feet (rms (root mean square)) and 250 feet bias. The bearing 134 (see FIG. 4) may have a bearing error 138 (see FIG. 4) of less than 9 degrees (rms), 27 degrees peak from −10 degrees to +10 degrees elevation, and less than 15 degrees (rms), 45 degrees peak from +10 to +20 degrees elevation. The relative altitude 124 (see FIG. 4) may have a 100 ft (foot) resolution.

By using bearings 134 (see FIG. 4) and distances 126 (see FIG. 4) from the one or more proximate vehicles 72 (see FIGS. 4-6B) through TCAS 120 (see FIG. 4) and by using the ADS-B data 102 from the one or more proximate vehicles 72 (see FIGS. 4-6B) through ADS-B 100 (see FIG. 4), an independent position solution 195b (see FIG. 4) can be computed in a ground-based location 190 (see FIG. 4) or in an air-based location 64 (see FIG. 4). The CPS 10a (see FIG. 4) may be used as an alternate navigation solution 195a, if a position solution using existing techniques is not available, or one or more onboard position sensors 84 (see FIG. 4) becomes non-operational. The ADS-B data 102 (see FIG. 4) and the TCAS data 122 (see FIG. 4) may be integrated with position sensors 84 on the host vehicle 70 (see FIG. 4) (e.g., global navigation satellite system (GNSS) 90 (see FIG. 4) position sensor 84 (see FIG. 4)), or in the FMS 76 (see FIG. 4), or the FMC 82 (see FIG. 4) to determine the navigation solutions 195 (see FIGS. 4, 7A-7D).

In determining the navigation position 71 (see FIGS. 4-5) of the host vehicle 70 (see FIGS. 4-5), the TCAS data 122 (see FIG. 4) and the ADS-B data 102 (see FIG. 4) from the proximate vehicle 72 (see FIGS. 4, 5) are initially synchronized and undergo a data synchronization 140 (see FIG. 4) by taking into account a data latency 142 (see FIG. 4) due to a transmission 144 (see FIG. 4) and one or more computations 146 (see FIG. 4) (in TCAS 120 (see FIG. 4) for computing bearing 134 (see FIG. 4) and slant range 128 (see FIG. 4)).

The TCAS data 122 (see FIG. 4) of the slant range 128 (see FIG. 4) and the bearing 134 (see FIG. 4) are checked for data reasonableness 152 (see FIG. 4), by a comparison with initial estimated positions 154 (see FIG. 4) of the slant range 128 (see FIG. 4) and the bearing 134 (see FIG. 4). The initial estimated positions 154 (see FIG. 4) of the slant range 128 (see FIG. 4) and the bearing 134 (see FIG. 4) are computed using last known positions 158 (see FIG. 4) propagated to real-time 156 (see FIG. 4) and ADS-B data 102 (see FIG. 4) of the navigation positions 73 (see FIG. 4) of the one or more proximate vehicles 72 (see FIG. 4).

The system 10, such as the CPS 10a (see FIG. 4), is computer implemented. The computer system 80 (see FIGS. 4, 10) is preferably coupled to the CPS 10a (see FIG. 4), including the CPS sensor 11a (see FIG. 4). The computer system 80 (see FIGS. 4, 10) comprises at least one computer 230 (see FIG. 10) and a processor device 232 (see FIG. 10) for executing one or more functions of the at least one computer 230 (see FIG. 10). The computer system 80 (see FIG. 4, 10) further comprises a computer software program 264 (see FIG. 10) adapted to perform via the computer 230 and the processor device 232, the steps of: checking the ADS-B data 102 and the TCAS data 122 for the data reasonableness 152 (see FIG. 4); performing the data synchronization 140 (see FIG. 4) of the ADS-B data 102 and the TCAS data 122; and computing a communal position system (CPS) position 150 (see FIG. 4) and a position accuracy 170 (see FIG. 4) based on the ADS-B data 102 and the TCAS data 122.

As shown in FIG. 4, the CPS 10a is used in determining one or more navigation solutions 195 for the vehicle 12, where the one or more navigation solutions 195 comprise one or more of, an alternate navigation solution 195a, an independent navigation solution 195b, and a complementary navigation solution 195c. The alternate navigation solution 195a (see FIG. 4) is used when one or more position sensors 84 on the host vehicle 70 is or becomes non-operational, experiences signal jamming 66a (see FIG. 4), experiences interference 66b (see FIG. 4), or experiences another problem or issue. The independent navigation solution 195b (see FIG. 4) is used for cross-checking 184 (see FIG. 4) and integrity monitoring 186 (see FIG. 4) of one or more of the position sensors 84 (see FIG. 4) on the host vehicle 70 (see FIG. 4). The complementary navigation solution 195c (see FIG. 4) is used when the ADS-B data 102 and the TCAS data 122 from the one or more proximate vehicles 72 is an integration 194 (see FIG. 4), and for example, is integrated into the GPS 86 (see FIG. 4), and the one or more proximate vehicles 72 function as additional satellites 274 (see FIG. 4) providing additional range measurements 276 (see FIG. 4), to improve a satellite-receiver geometry 278 (see FIG. 4).

As shown in FIG. 4, the system 10, such as in the form of CPS 10a, includes the apparatus 11, such as the CPS sensor 11a. In another embodiment, there is provided the apparatus 11 (see FIG. 4) for using ADS-B data 102 (see FIG. 4) and TCAS data 122 (see FIG. 4) for determining one or more navigation solutions 195 (see FIG. 4) for a vehicle 12. The apparatus 11 comprises the communal position system (CPS) sensor 11a located in the vehicle 12 comprising a host vehicle 70. The CPS sensor 11a is configured to receive ADS-B data 102 from each of the one or more proximate vehicles 72 in proximity to the host vehicle 70, through the ADS-B 100 (see FIG. 4), and is further configured to receive TCAS data 122 from each of the one or more proximate vehicles 72, through the TCAS 120. The CPS sensor 11a is used to determine one or more navigation solutions 195 (see FIG. 4) for the vehicle 12. The one or more navigation solutions 195 comprises one or more of, the alternate navigation solution 195a (see FIG. 4), the independent navigation solution 195b (see FIG. 4), and the complementary navigation solution 195c (see FIG. 4).

The apparatus 11, such as the CPS sensor 11a, is computer implemented. The CPS sensor 11a is coupled to the computer system 80 (see FIGS. 4, 10) comprising at least one computer 230 (see FIG. 10) and a processor device 232 (see FIG. 10) for executing one or more functions of the at least one computer 230 (see FIG. 10), and further comprising a computer software program 264 (see FIG. 10) adapted to perform via the computer 230 (see FIG. 10) and the processor device 232 (see FIG. 10), the steps, as discussed above, of: checking the ADS-B data 102 and the TCAS data 122 for data reasonableness 152 (see FIG. 4); performing data synchronization 140 (see FIG. 4) of the ADS-B data 102 and the TCAS data 122; and computing the communal position system (CPS) position 150 (see FIG. 4) and the position accuracy 170 (see FIG. 4) based on the ADS-B data 102 and the TCAS data 122. The CPS sensor 11a may be integrated in one of, the FMC 82 (see FIG. 4) in the host vehicle 70, the GPS 86 (see FIG. 4) in the host vehicle 70, the TCAS 120 (see FIG. 4) in the host vehicle 70, or another suitable integration 194 (see FIG. 4).

Figure 5:
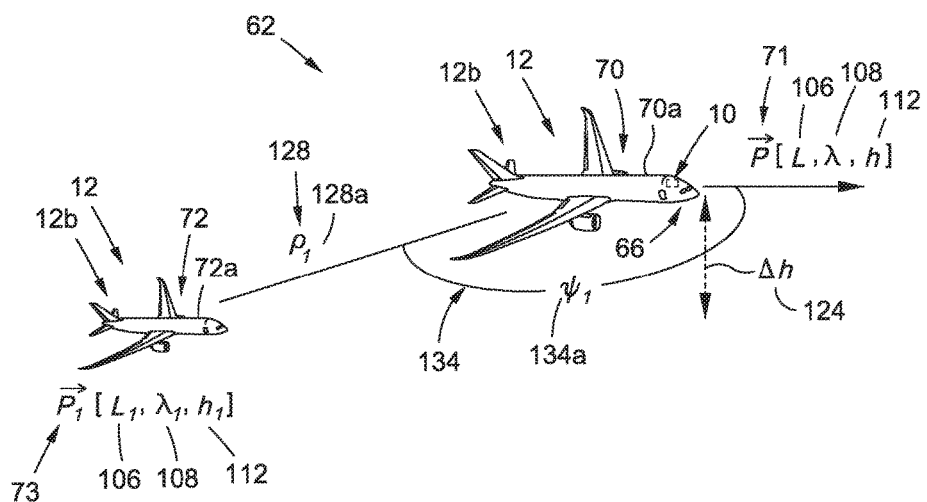
FIG. 5 is an illustration of a schematic diagram of an embodiment of a host vehicle with the system of the disclosure using one proximate vehicle.

FIG. 5 is an illustration of a schematic diagram of an embodiment of the host vehicle 70, such as the first vehicle 70a, with the system 10 of the disclosure using one proximate vehicle 72, such as the second vehicle 72a to determine a navigation position $\vec{P}$ 71 of the host vehicle 70. As shown in FIG. 5, the host vehicle 70 and the proximate vehicle 72 are preferably vehicles 12, such as in the form of aircraft 12b in an air environment 62. As shown in FIG. 5, the host vehicle 70 comprises the first vehicle 70a in a jamming environment 66, and the proximate vehicle 72 comprises the second vehicle 72a. The host vehicle 70 (see FIG. 5) has a bearing ($\psi$) 134 (see FIG. 5), such as a magnetic bearing ($\psi_1$) 134a (see FIG. 5). As further shown in FIG. 5, the navigation position $\vec{P}$ 71 of the host vehicle 70 includes [L, $\lambda$, h], which is latitude L 106, longitude $\lambda$ 108, and baro (barometric) altitude h 112.

In determining the navigation position $\vec{P}$ 71 (see FIGS. 4-5) of the host vehicle 70 (see FIGS. 4-5), the TCAS data 122 (see FIG. 4) and the ADS-B data 102 (see FIG. 4) from the proximate vehicle 72 (see FIGS. 4, 5), as discussed above, are initially synchronized by taking into account data latency 142 (see FIG. 4) due to transmission 144 (see FIG. 4) and computation 146 (see FIG. 4) (in TCAS 120 (see FIG. 4) for computing bearing 134 (see FIG. 4) and slant range 128 (see FIG. 4)). The TCAS data 122 (see FIG. 4) of the slant range 128 (see FIG. 4) and the bearing 134 (see FIG. 4) are checked for data reasonableness 152 (see FIG. 4), by a comparison with initial estimated positions 154 (see FIG. 4) of the slant range 128 (see FIG. 4) and the bearing 134 (see FIG. 4). The initial estimated positions 154 (see FIG. 4) of the slant range 128 (see FIG. 4) and the bearing 134 (see FIG. 4) are computed using the last known positions 158 (see FIG. 4) propagated to real-time 156 (see FIG. 4) and ADS-B data 102 (see FIG. 4) of the proximate vehicle position $\vec{P}_1$ 73. For example, based on existing TCAS 120 (see FIG. 4) industry specifications, if a range error 132 (see FIG. 4) is within 350 ft (feet) (250 ft (feet) bias+2*50 rms (root mean square)), a range measurement 130 (see FIG. 4) is considered reasonable; and if a bearing error 138 (see FIG. 4) is within 18 degrees (2*9 rms), a bearing measurement 136 (see FIG. 4) is considered reasonable. The position navigation integrity category (NIC) 110 (see FIG. 4) of ADS-B data 102 (see FIG. 4) is also checked to ensure it is acceptable.

Examples of computing navigation positions 71 (see FIG. 4), such as a CPS position 150 (see FIG. 4) or a 3-D (three-dimensional) CPS position 150a (see FIG. 4), of the host vehicle 70, are discussed below.

EXAMPLE 1

In determining the navigation position $\vec{P}$ 71 (see FIGS. 4-5), such as the CPS position 150 (see FIG. 4), of the host vehicle 70 using one proximate vehicle 72, as shown in FIG. 5, the following steps were taken and computations 146 (see FIG. 4) were made:

(a) It was assumed that the proximate vehicle 72 (see FIG. 5) had a known slant range $\rho$ 128 (see FIG. 5), such as a known first slant range $\rho_1$ 128a (see FIG. 5), from the host vehicle 70 (see FIG. 5), a known bearing $\psi$ 134 (see FIG. 5), such as a magnetic bearing $\psi_1$ 134a (see FIG. 5), from the host vehicle 70, and a known relative altitude $\Delta h$ 124 (see FIG. 5) from TCAS 120 (see FIG. 4). It was also assumed that the proximate vehicle 72 (see FIG. 5) had a known latitude $L_1$ 106 (see FIG. 5), a known longitude $\lambda_1$ 108 (see FIG. 5), and a known baro (barometric) altitude $h_1$ 112 (see FIG. 5) from the ADS-B 100 (see FIG. 4). It was also assumed the baro (barometric) altitude 112 (see FIG. 5) and true track angles 148 (see FIG. 4) of the host vehicle 70 (see FIGS. 4, 5) were available.

(b) The navigation position $\vec{P}_1$ 73 (see FIG. 5) of the proximate vehicle 72 (see FIG. 5) was converted to an Earth Centered Earth Fixed (ECEF) frame 160 (see FIG. 4), which becomes $\vec{P}_{1,e}$.

(c) With the first slant range $\rho_1$ 128a (see FIG. 5) and the bearing $\psi_1$ 134a (see FIG. 5) and the true track angle 148 (see FIG. 4) of the host vehicle 70 (see FIG. 5), a navigation position $\vec{P}$ 71 (see FIGS. 4-5) of the host vehicle 70 (see FIGS. 4-5) was computed in ECEF frame 160 (see FIG. 4) as follows:

$$\vec{P}_{h,e} = \vec{P}_{1,e} + C_n^e \begin{bmatrix} \rho_{l1} \sin(\psi_{1T} + \varphi) \\ \rho_{l1} \cos(\psi_{1T} + \varphi) \\ h_1' \end{bmatrix}$$

Where:

$\psi_{1T}$ is the true bearing by adding magnetic variation to the magnetic bearing $\psi_1$.

$C_n^e$ is the direction cosine matrix that transforms the vector from a navigation ENU (East-North-Up) frame 162 (see FIG. 4) to an ECEF frame 160 (see FIG. 4).

$\rho_{l1}$ is the horizontal range from the proximate vehicle 72 in the ENU (East-North-Up) frame 162, $\rho_{l1} = \sqrt{\rho_1^2 - h_1'^2}$.

$h_1'$ is the host vehicle height in the navigation ENU frame 162 (see FIG. 4).

$$h_1' = \frac{\Delta h^2 + 2r\Delta h - \rho_1^2}{2r}$$

r is the earth radius 164 (see FIG. 4) at the host vehicle 70, $$r = \frac{a}{\sqrt{1 - e^2 \sin^2 L_1}} + h.$$

The latitude 106 of the proximate vehicle 72 was used instead, as the resulting error in the earth radius 164 (see FIG. 4) is negligible.

h is the baro (barometric) altitude 112 of the host vehicle 70 in meters.

a=6378137.0 m, semi-major axis of elliptical earth.

$e^2$=0.006694379991013, square of earth eccentricity.

$\Delta h = h - h_1$, is a relative altitude 124 (see FIG. 4), which is the difference between the host vehicle 70 altitude and the proximate vehicle 72 altitude in meters (m).

For the host vehicle 70 (see FIG. 5) with the system 10 (see FIG. 5) using one proximate vehicle 72 (see FIG. 5), the resulting position accuracy 170 (see FIG. 4) of the navigation position $\vec{P}$ 71 (see FIGS. 4-5) of the host vehicle 70 was a function of a baro (barometric) altitude accuracy 172 (see FIG. 4), a TCAS ranging accuracy 174 (see FIG. 4) and a TCAS bearing accuracy 176 (see FIG. 4), and the position NIC 110 (see FIG. 4) of the proximate vehicle 72 (see FIGS. 4, 5). The main contributor to the position accuracy 170 (see FIG. 4) was the bearing 134 (see FIG. 4) of the proximate vehicle 72 (see FIGS. 4, 5). For example, with a TCAS bearing accuracy 176 (see FIG. 4) of 9 degrees, the position accuracy 170 (see FIG. 4) was a function of distance 126 (see FIG. 4) to the proximate vehicle 72 (see FIGS. 4, 5). For example, of a 10 nm (nautical miles) distance, the position accuracy 170 (see FIG. 4) was about 1.5 nm (nautical mile).

Figure 6A:
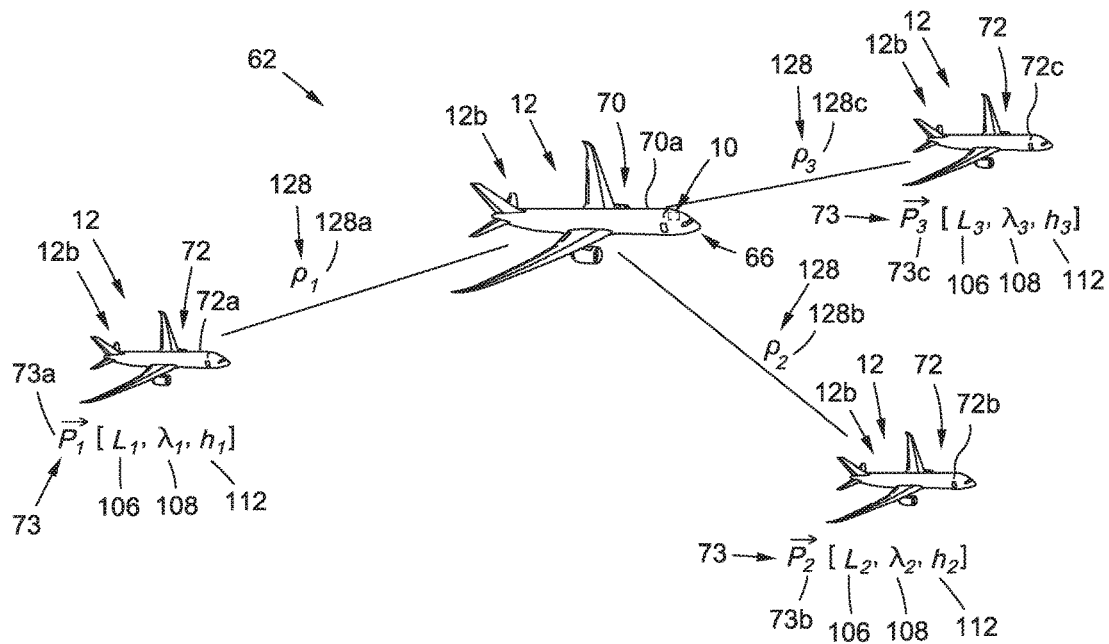
FIG. 6A is an illustration of a schematic diagram of an embodiment of a host vehicle with the system of the disclosure using multiple proximate vehicles.

FIG. 6A is an illustration of a schematic diagram of an embodiment of a host vehicle 70, such as a first vehicle 70a, with the system 10 of the disclosure, using three proximate vehicles 72, such as in the form of the second vehicle 72a, the third vehicle 72b, and the fourth vehicle 72c, to determine the navigation position $\vec{P}$ 71 (see FIG. 4) of the host vehicle 70 (see FIG. 6A). As shown in FIG. 6A, the host vehicle 70 and the proximate vehicles 72 are preferably vehicles 12, such as in the form of aircraft 12b, in an air environment 62. As shown in FIG. 6A, the host vehicle 70 comprises the first vehicle 70a in a jamming environment 66, and the proximate vehicles 72 comprise the second vehicle 72a, the third vehicle 72b, and the fourth vehicle 72c.

As further shown in FIG. 6A, the proximate vehicle 72, such as the second vehicle 72a, in relation to the host vehicle 70, has a known slant range $\rho$ 128, such as a known first slant range $\rho_1$ 128a, from the TCAS 120 (see FIG. 4), and the proximate vehicle 72, such as the second vehicle 72a, has navigation position $\vec{P}_1$ 73, such as first navigation position 73a, with a known latitude $L_1$ 106, a known longitude $\lambda_1$ 108, and a known baro (barometric) altitude $h_1$ 112 from the ADS-B 100 (see FIG. 4). As further shown in FIG. 6A, the proximate vehicle 72, such as the third vehicle 72b, in relation to the host vehicle 70, has a known slant range $\rho$ 128, such as a known second slant range $\rho_2$ 128b, from the TCAS 120 (see FIG. 4), and the proximate vehicle 72, such as the third vehicle 72b, has navigation position $\vec{P}_2$ 73, such as second navigation position 73b, with a known latitude $L_2$ 106, a known longitude $\lambda_2$ 108, and a known baro (barometric) altitude $h_2$ 112 from the ADS-B 100 (see FIG. 4). As further shown in FIG. 6A, the proximate vehicle 72, such as the fourth vehicle 72c, in relation to the host vehicle 70, has a known slant range $\rho$ 128, such as a known third slant range $\rho_3$ 128b, from the TCAS 120 (see FIG. 4), and the proximate vehicle 72, such as the fourth vehicle 72c, has navigation position $\vec{P}_3$ 73, such as third navigation position 73c, with a known latitude $L_3$ 106, a known longitude $\lambda_3$ 108, and a known baro (barometric) altitude $h_3$ 112 from the ADS-B 100 (see FIG. 4).

EXAMPLE 2

In determining the navigation position $\vec{P}$ 71 (see FIG. 4), such as a CPS position 150 (see FIG. 4), of the host vehicle 70 using two or more proximate vehicles 72, for example, three proximate vehicles 72, as shown in FIG. 6A, instead of using the bearing 134 (see FIG. 4), only the slant ranges 128 (see FIGS. 4, 6A) to the proximate vehicles 72 (see FIG. 6A) were used. It was assumed the baro (barometric) altitude 112 of the host vehicle 70 ($h_{h0}$) was available. It was assumed there were three (3) proximate vehicles 72, such as the second vehicle 72a (see FIG. 6A), the third vehicle 72b (see FIG. 6A), and the fourth vehicle 72c (see FIG. 6A). The navigation position $\vec{P}$ 71, such as the CPS position 150 (see FIG. 4), of the host vehicle 70 (see FIGS. 4, 6A), was computed iteratively and the following steps were taken:

(a) Started from the initial estimated position 154 (see FIG. 4) or the last known position 158 (see FIG. 4) of the host vehicle 70 (see FIG. 6A), $\vec{P}_{h0}=[L_{h0}, \lambda_{h0}, h_{h0}]$.

(b) Converted $\vec{P}_{h0}$, $\vec{P}_1$, $\vec{P}_2$, and $\vec{P}_3$ to ECEF (Earth Centered Earth Fixed) frame 160 (see FIG. 4), and obtained $\vec{P}_{h0,e}$, $\vec{P}_{1,e}$, $\vec{P}_{2,e}$, and $\vec{P}_{3,e}$.

(c) Converted the slant ranges 128 (see FIG. 4) $\rho_1, \rho_2$, and $\rho_3$ to local horizontal ranges 166 (see FIG. 4) $\rho_{l1}, \tau_{l2}$, and $\rho_{l3}$ in a local horizontal plane of the ENU (East-North-UP) frame 162 (see FIG. 4):

$$\rho_{li} = \sqrt{\rho_i^2 - h_{li}^2}$$

Where:

$$h_{li} = \frac{\Delta h_i^2 + 2r\Delta h_i - \rho_i^2}{2r}$$

$$\Delta h_i = h_i - h_{h0} (i=1,2,3).$$

r is the earth radius 164 (see FIG. 4) at $\vec{P}_{h0}$.

$$r = \frac{a}{\sqrt{1 - e^2 \sin^2 L_{h0}}} + h_{h0}.$$

(d) The navigation positions 73 (see FIGS. 4, 6A) of the three proximate vehicles 72 (see FIGS. 4, 6A) were converted to a local navigation frame relative to $\vec{P}_{h0}$ and their coordinates are $[e_1, n_1, u_1]$, $[e_2, n_2, u_2]$, and $[e_3, n_3, u_3]$. Formed the direction cosine matrix relative to $\vec{P}_{h0}$:

$$H = \begin{bmatrix} \frac{e_1}{\sqrt{e_1^2+n_1^2}} & \frac{n_1}{\sqrt{e_1^2+n_1^2}} \\ \frac{e_2}{\sqrt{e_2^2+n_2^2}} & \frac{n_2}{\sqrt{e_2^2+n_2^2}} \\ \frac{e_3}{\sqrt{e_3^2+n_3^2}} & \frac{n_3}{\sqrt{e_3^2+n_3^2}} \end{bmatrix}$$

(e) The local horizontal range 166 (see FIG. 4) was computed in ENU frame 162:

$$\rho_{l1c}=\sqrt{e_1^2+n_1^2}, \rho_{l2c}=\sqrt{e_2^2+n_2^2}, \rho_{l3c}=\sqrt{e_3^2+n_3^2}.$$

(f) Obtained delta horizontal range: $\Delta\rho_{l1}=\rho_{l1c}-\rho_{l1}$, $\Delta\rho_{l2}=\rho_{l2c}-\rho_{l2}$, $\Delta\rho_{l3}=\rho_{l3c}-\rho_{l3}$.

(g) Solved for the navigation positions 73 (see FIGS. 4, 6A) using a weighted Least Squares method 168 (see FIG. 4):

$$\begin{bmatrix} \Delta e_{h1} \\ \Delta n_{h1} \end{bmatrix} = (H^T W H)^{-1} H^T W \begin{bmatrix} \Delta\rho_{l1} \\ \Delta\rho_{l2} \\ \Delta\rho_{l3} \end{bmatrix}$$

Where:

$$W = \begin{bmatrix} \frac{1}{\sigma_1^2} & 0 & 0 \\ 0 & \frac{1}{\sigma_2^2} & 0 \\ 0 & 0 & \frac{1}{\sigma_3^2} \end{bmatrix}$$

is a weighting matrix, $\sigma_i$ (i=1, 2, 3) is proportional to the position NIC 110 (see FIG. 4) in the ADS-B data 102 (see FIG. 4) from the three proximate vehicles 72 (see FIGS. 4, 6A).

(h) If $\sqrt{\Delta e_{h1}^2 + \Delta n_{h1}^2} < 1e^{-3}$, the iteration was stopped, and the navigation position 71 (see FIGS. 4, 6A) of the host vehicle 70 (see FIGS. 4, 6A) in the ECEF frame 160 (see FIG. 4) was:

$$\vec{P}_{h1,e} = \vec{P}_{h0,e} + C_n^e \begin{bmatrix} \Delta e_{h1} \\ \Delta n_{h1} \\ 0 \end{bmatrix}.$$

Otherwise, let $\vec{P}_{h0,e} = \vec{P}_{h1,e}$, and returned to step (c) for the next iteration.

For the host vehicle 70 (see FIG. 6A) with the system 10 (see FIG. 6A) using the three proximate vehicles 72 (see FIG. 6A), the resulting position accuracy 170 (see FIG. 4), such as a horizontal position accuracy 170a (see FIG. 4), was a function of the baro (barometric) altitude accuracy 172 (see FIG. 4), a TCAS ranging accuracy 174 (see FIG. 4), vehicle geometries 178 (see FIG. 4) of the host vehicle 70 (see FIGS. 4, 6A) and the proximate vehicles 72 (see FIGS. 4, 6A), and the position NIC 110 (see FIG. 4) of the proximate vehicles 72 (see FIGS. 4, 6A). A vertical dilution of precision (VDOP) 180 (see FIG. 4) was assumed due to vehicle geometry 178 (see FIG. 4) of 1.5, and a given baro (barometric) altitude accuracy 172 (see FIG. 4) of 50 ft (feet), a TCAS ranging accuracy 174 (see FIG. 4) with a range error 132 (see FIG. 4) of 50 ft (feet) rms (root mean square) and 250 ft (feet) bias, and the position accuracy 170 (see FIG. 4) of the proximate vehicles 72 (see FIGS. 4, 6A) of 30 ft (feet) (1σ) (see FIG. 4), the resulting position accuracy 170 (see FIG. 4), such as the horizontal position accuracy 170a (see FIG. 4), of 95% of the host vehicle 70 (see FIGS. 4, 6A) was about:

$$2*1.5*\sqrt{250^2 + 2*50^2 + 30^2} \approx 785 \text{ ft} \approx 239 \text{ m} \approx 0.13 \text{ nm}$$
(nautical mile).

Figure 6B:
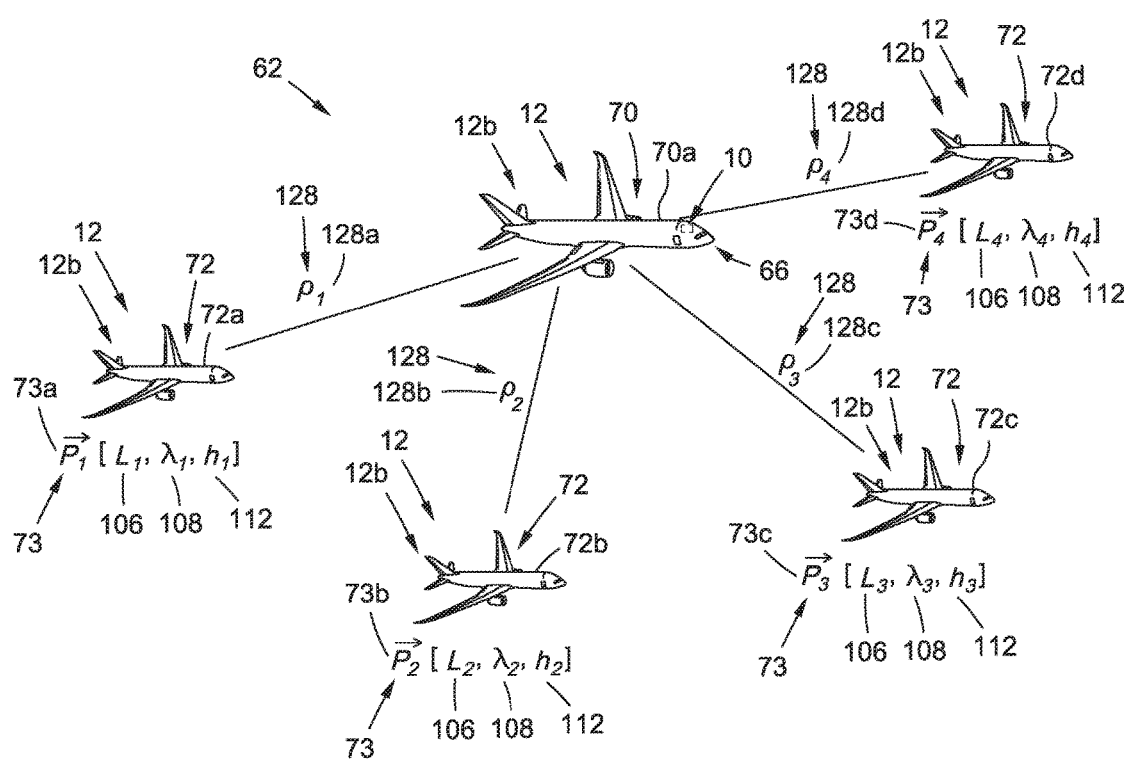
FIG. 6B is an illustration of a schematic diagram of another embodiment of a host vehicle with the system of the disclosure using multiple proximate vehicles.

FIG. 6B is an illustration of a schematic diagram of another embodiment of a host vehicle 70, such as a first vehicle 70a, with the system 10 of the disclosure, using three or more proximate vehicles 72, for example, using four proximate vehicles 72, such as in the form of second vehicle 72a, third vehicle 72b, fourth vehicle 72c, and a fifth vehicle 72d, to determine the navigation position $\vec{P}$ 71 (see FIG. 4), such as a 3-D (three-dimensional) CPS position 150a (see FIG. 4) of the host vehicle 70 (see FIGS. 4, 6B). As shown in FIG. 6B, the host vehicle 70 and the proximate vehicles 72 are preferably vehicles 12, such as in the form of aircraft 12b, in an air environment 62. As shown in FIG. 6B, the host vehicle 70 comprises the first vehicle 70a in a jamming environment 66, and the proximate vehicles 72 comprise the second vehicle 72a, the third vehicle 72b, the fourth vehicle 72c, and the fifth vehicle 72d.

As further shown in FIG. 6B, the proximate vehicle 72, such as the second vehicle 72a, in relation to the host vehicle 70, has a known slant range ρ 128, such as a known first slant range $\rho_1$ 128a, from the TCAS 120 (see FIG. 4), and the proximate vehicle 72, such as the second vehicle 72a, has navigation position $\vec{P}_1$ 73, such as first navigation position 73a, with a known latitude $L_1$ 106, a known longitude $\lambda_1$ 108, and a known baro (barometric) altitude $h_1$ 112 from the ADS-B 100 (see FIG. 4). As further shown in FIG. 6B, the proximate vehicle 72, such as the third vehicle 72b, in relation to the host vehicle 70, has a known slant range ρ 128, such as a known second slant range $\rho_2$ 128b, from the TCAS 120 (see FIG. 4), and the proximate vehicle 72, such as the third vehicle 72b, has navigation position $\vec{P}_2$ 73, such as second navigation position 73b, with a known latitude $L_2$ 106, a known longitude $\lambda_2$ 108, and a known baro (barometric) altitude $h_2$ 112 from the ADS-B 100 (see FIG. 4). As further shown in FIG. 6B, the proximate vehicle 72, such as the fourth vehicle 72c, in relation to the host vehicle 70, has a known slant range ρ 128, such as a known third slant range $\rho_3$ 128c, from the TCAS 120 (see FIG. 4), and the proximate vehicle 72, such as the fourth vehicle 72c, has navigation position $\vec{P}_3$ 73, such as third navigation position 73c, with a known latitude $L_3$ 106, a known longitude $\lambda_3$ 108, and a known baro (barometric) altitude $h_3$ 112 from the ADS-B 100 (see FIG. 4). As further shown in FIG. 6B, the proximate vehicle 72, such as the fifth vehicle 72d, in relation to the host vehicle 70, has a known slant range ρ 128, such as a known fourth slant range $\rho_4$ 128d, from the TCAS 120 (see FIG. 4), and the proximate vehicle 72, such as the fifth vehicle 72d, has navigation position $\vec{P}_4$ 73, such as fourth navigation position 73d, with a known latitude $L_4$ 106, a known longitude $\lambda_4$ 108, and a known baro (barometric) altitude $h_4$ 112 from the ADS-B 100 (see FIG. 4).

EXAMPLE 3

In determining the navigation position $\vec{P}$ 71 (see FIG. 4), such as the 3-D (three-dimensional) CPS position 150a (see FIG. 4), of the host vehicle 70 using three or more proximate vehicles 72, for example, four proximate vehicles 72, as shown in FIG. 6B, it was assumed there were four (4) proximate vehicles 72, such as the second vehicle 72a (see FIG. 6B), the third vehicle 72b (see FIG. 6B), the fourth vehicle 72c (see FIG. 6B), and the fifth vehicle 72d (see FIG. 6B). The navigation position $\vec{P}$ 71, such as the 3-D (three-dimensional) CPS position 150a (see FIG. 4), of the host vehicle 70 (see FIGS. 4, 6B) was computed iteratively, and the following steps were taken:

(a) Started from the initial estimated position 154 (see FIG. 4) or the last known position 158 (see FIG. 4) of the host vehicle 70 (see FIG. 6B), $\vec{P}_{h0} = [L_{h0}, \lambda_{h0}, h_{h0}]$.

(b) Converted $\vec{P}_{h0}$, $\vec{P}_1$, $\vec{P}_2$, $\vec{P}_3$ and $\vec{P}_4$ to ECEF (Earth Centered Earth Fixed) frame 160 (see FIG. 4), and obtained:

$\vec{P}_{h0,e}$ [$x_{h0,e}$ $y_{h0,e}$ $z_{h0,e}$], $\vec{P}_{1,e}$ [$x_{1,e}$ $y_{1,e}$ $z_{1,e}$], $\vec{P}_{2,e}$ [$x_{2,e}$ $y_{2,e}$ $z_{2,e}$], $\vec{P}_{3,e}$ [$x_{3,e}$ $y_{3,e}$ $z_{3,e}$], and $\vec{P}_{4,e}$ [$x_{4,e}$ $y_{4,e}$ $z_{4,e}$].

(c) Formed the direction cosine matrix relative to $\vec{P}_{h0}$: The $i^{th}$ row:

$$H[i,:] = \begin{bmatrix} \dfrac{x_{h0,e} - x_{i,e}}{\sqrt{(x_{h0,e} - x_{i,e})^2 + (y_{h0,e} - y_{i,e})^2 + (z_{h0,e} - z_{i,e})^2}} \\ \dfrac{y_{h0,e} - y_{i,e}}{\sqrt{(x_{h0,e} - x_{i,e})^2 + (y_{h0,e} - y_{i,e})^2 + (z_{h0,e} - z_{i,e})^2}} \\ \dfrac{z_{h0,e} - z_{i,e}}{\sqrt{(x_{h0,e} - x_{i,e})^2 + (y_{h0,e} - y_{i,e})^2 + (z_{h0,e} - z_{i,e})^2}} \end{bmatrix}^T$$

(d) Computed the slant ranges 128 (see FIG. 6B) $\rho_1$, $\rho_2$, $\rho_3$ and $\rho_4$ of the proximate vehicles 72a, 72b, 72c, 72d (see FIG. 6B), respectively:

$$\rho_{ic} = \sqrt{(x_{h0,e} - x_{1,e})^2 + (y_{h0,e} - y_{i,e})^2 + (z_{h0,e} - z_{i,e})^2}.$$

(e) Obtained delta horizontal range: $\Delta\rho_i = \rho - \rho_{ic}$.

(f) Solved for the navigation positions 73 (see FIGS. 4, 6B), such as the 3-D CPS positions 150a (see FIG. 4), using the weighted Least Squares method 168 (see FIG. 4):

$$\begin{bmatrix} \Delta x_{h0,e} \\ \Delta y_{h0,e} \\ \Delta z_{h0,e} \end{bmatrix} = (H^T W H)^{-1} H^T W \begin{bmatrix} \Delta\rho_1 \\ \Delta\rho_2 \\ \Delta\rho_3 \\ \Delta\rho_4 \end{bmatrix}$$

Where the weighting matrix W is a diagonal matrix and its $i^{th}$ diagonal element $$W[i,i] = \dfrac{1}{\sigma_i^2}, \sigma_i (i = 1, 2, 3, 4)$$

is proportional to the position NIC 110 (see FIG. 4) in the ADS-B data 102 (see FIG. 4) from the proximate vehicles 72.

(g) If $\sqrt{\Delta x_{h0,e}^2 + \Delta y_{h0,e}^2 + \Delta z_{h0,e}^2} < 1e^{-3}$, the iteration was stopped, and the navigation position 71 (see FIGS. 4, 6B), such as the 3-D CPS position 150a (see FIG. 4), of the host vehicle 70 (see FIGS. 4, 6B) in the ECEF frame 160 (see FIG. 4) was:

$$\vec{P}_{h1,e} = \vec{P}_{h0,e} + \begin{bmatrix} \Delta x_{h0,e} \\ \Delta y_{h0,e} \\ \Delta z_{h0,e} \end{bmatrix}.$$

Otherwise, let $\vec{P}_{h0,e} = \vec{P}_{h1,e}$, and returned to step (c) for the next iteration.

For the host vehicle 70 (see FIG. 6B) with the system 10 (see FIG. 6B) using the four proximate vehicles 72 (see FIG. 6B), a resulting 3-D (three-dimensional) position accuracy 170b (see FIG. 4) was a function of TCAS ranging accuracy 174 (see FIG. 4), vehicle geometries 178 (see FIG. 4) of the host vehicle 70 (see FIGS. 4, 6B) and the proximate vehicles 72 (see FIGS. 4, 6B), and the position NIC 110 (see FIG. 4) of the proximate vehicles 72 (see FIGS. 4, 6B). A vertical dilution of precision (VDOP) 180 (see FIG. 4) was assumed due to vehicle geometry 178 (see FIG. 4) of 1.5, a TCAS ranging accuracy 174 (see FIG. 4) with a range error 132 (see FIG. 4) of 50 ft (feet) rms (root mean square) and 250 ft bias, and the 3-D position accuracy 170b (see FIG. 4) of the proximate vehicles 72 (see FIGS. 4, 6B) of 30 ft (feet) (1σ) (see FIG. 4), the resulting position accuracy 170 (see FIG. 4) of 95% of the host vehicle 70 (see FIGS. 4, 6B) was about:

$$2*1.5*\sqrt{250^2 + 50^2 + 30^2} \approx 770 \text{ ft} \approx 235 \text{ m} \approx 0.13 \text{ nm (nautical mile)}.$$

Thus, the 3-D (three-dimensional) CPS position 150a of the host vehicle 70 (see FIG. 6B) was computed iteratively using TCAS range measurements 130 and ADS-B data 102 from the four (4) proximate vehicles 72, which is similar to a GPS 86 receiver computing a three-dimensional (3-D) position.

The slant ranges 128 (see FIGS. 4-6B) and distances 126 (see FIG. 4) from the one or more proximate vehicles 72 (see FIG. 4) may be integrated into GPS 86 (see FIG. 4) receivers and used as additional satellite(s) 274 (see FIG. 4). The range measurement 130 (see FIG. 4) can be weighted based on a known TCAS ranging accuracy 172 (see FIG. 4) and its existence may improve a satellite-receiver geometry 278 (see FIG. 4), in particular, a vertical dilution of precision (VDOP) 180 (see FIG. 4), if the one or more proximate vehicle(s) 72 (see FIGS. 4-6B) is/are below the host vehicle 70 (see FIGS. 4-6B). Similarly, the slant ranges 128 (see FIG. 4) and distances 126 (see FIG. 4) from the proximate vehicles 72 (see FIGS. 4-6B) may be integrated into an FMC (flight management computer) navigation 82a (see FIGS. 7A-7D) of the FMC 82 (see FIG. 4) using a Kalman filter 182 (see FIG. 4).

The CPS position 150 (see FIG. 4) and the 3-D CPS position 150a (see FIG. 4), as computed above, may be integrated into the FMC 82 (see FIGS. 4, 7A) with existing inertial position sensors (IRS) 88 (see FIG. 4) and/or radio position sensors 92 (see FIG. 4), such as the DME/DME 97 position or the DME/VOR 98 position using the Kalman filter 182 (see FIG. 4), or another suitable complementary filter. The DME/DME 97 position and the DME/VOR 98 positions are based on DME (distance measuring equipment), which is a ground navigational aid that may be at a ground-based location 190 (see FIG. 4) that can provide display of distance 126 (see FIG. 4) to a selected ground navigational radio transmitter. The VOR (very high frequency omnidirectional ranging) 96 (see FIG. 4) is a ground navigational aid that may be at a ground-based location 190 (see FIG. 4) that can provide display of a vehicle position relative to a course through a selected ground navigational radio transmitter.

Further, when a group of vehicles 12, such as autonomous unmanned air vehicles (UAVs) 12c (see FIG. 4) operates in a relatively close range, either to go from one location to another location, or to perform a single task cooperatively, the system 10 (see FIG. 4), such as the CPS 10a (see FIG. 4) with the CPS sensor 11a (see FIG. 4) eliminates the need for all vehicles 12, such as aircraft 12b (see FIG. 4) or UAVs 12c (see FIG. 4), to have position sensors 84 (see FIG. 4), such as inertial reference system (IRS) sensors 88 (see FIG. 4), global navigation satellite system (GNSS) 90 (see FIG. 4) sensors, and radio position sensors 92 (see FIG. 4).

If a small subset of vehicles 12, such as aircraft 12b (see FIG. 4), and tagged as leaders 70b (see FIG. 4), have the positions sensors 84 (see FIG. 4), the remaining vehicles 12, such as aircraft 12b (see FIG. 4), and tagged as workers 72e (see FIG. 4), may compute their independent navigation solutions 195 (see FIGS. 7A-7D) using only their ADS-B 100 (see FIG. 4) and TCAS 120 (see FIG. 4). Thus, this may reduce or minimize navigation sensor installation costs to operate a group of vehicles 12, such as aircraft 12b (see FIG. 4). Also, it may accommodate different operational objectives where the leaders 70b (see FIG. 4) may be located either in a ground environment 188 (see FIG. 4) at a ground-based location 190 (see FIG. 4) or on a ground-based vehicle 192 (see FIG. 4), or in an air environment 62 (see FIG. 4) on an air-based location 64 (see FIG. 4), with the workers 72e (see FIG. 4).

Figure 7A:
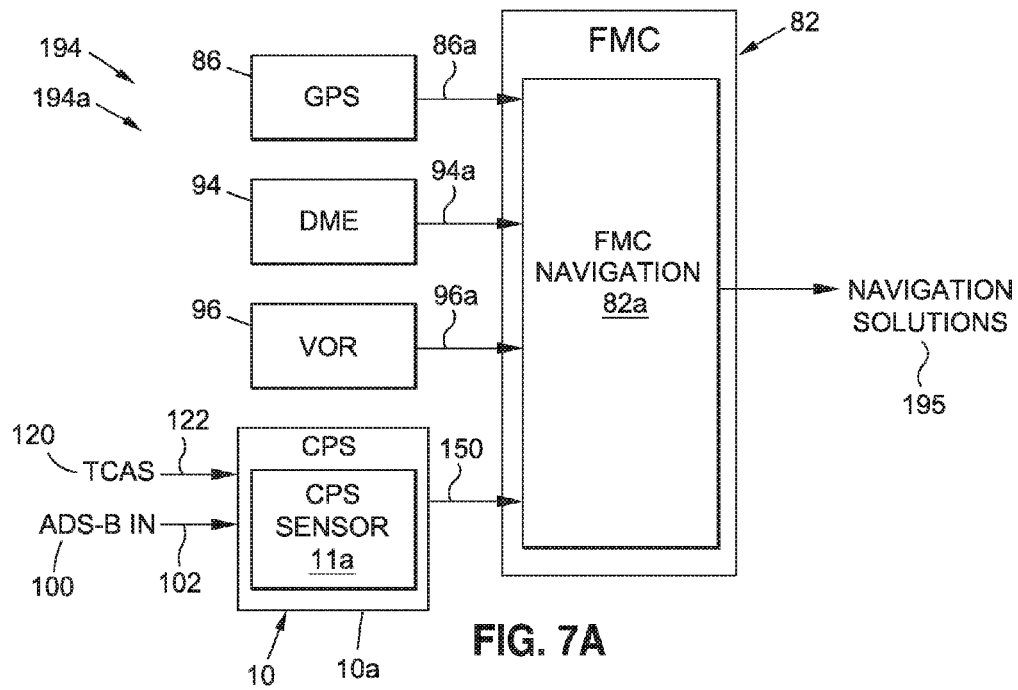
FIG. 7A is schematic diagrams of an embodiment of a sensor integration of the communal position system (CPS) sensor of the disclosure.

Now referring to FIG. 7A, FIG. 7A shows a schematic diagram of an embodiment of an integration 194, such as a sensor integration 194a of the communal position system (CPS) sensor 11a of the system 10, such as the communal position system (CPS) 10a, of the disclosure. As shown in FIG. 7A, the system 10, such as the CPS 10a, comprising the CPS sensor 11a, is a separate module or box external to and used with a flight management computer (FMC) 82, that includes a flight management computer (FMC) navigation 82a. As further shown in FIG. 7A, the TCAS data 122 from the TCAS 120 of the one or more of the proximate vehicles 72 (see FIGS. 4-6B), and the ADS-B data 102 from the ADS-B 100 of the one or more of the proximate vehicles 72 (see FIGS. 4-6B) are transmitted to, and received by, the system 10, such as the CPS 10a, comprising the CPS sensor 11a. The CPS position 150 determined in the system 10, such as the CPS 10a, is input to the FMC navigation 82a of the FMC 82. As further shown in FIG. 7A, global positioning system (GPS) data 86a from the GPS 86 is input to the FMC navigation 82a of the FMC 82, distance measuring equipment (DME) data 94a from the DME 94 is input to the FMC navigation 82a of the FMC 82, and very high frequency omnidirectional ranging (VOR) data 96a from the VOR 96 is input to the FMC navigation 82a of the FMC 82. As further shown in FIG. 7A, navigation solutions 195 result from and are output from the FMC navigation 82a of the FMC 82.

Figure 7B:
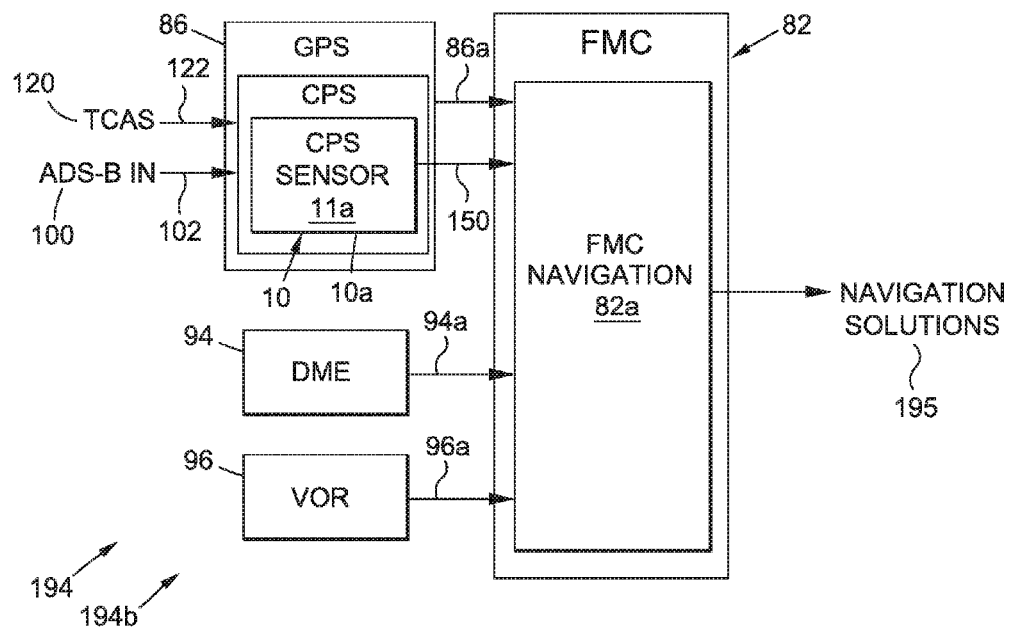
FIG. 7B is schematic diagram of an embodiment of a GPS integration with the communal position system (CPS) sensor of the disclosure.

Now referring to FIG. 7B, FIG. 7B shows a schematic diagram of an embodiment of an integration 194, such as a GPS integration 194b with the communal position system (CPS) sensor 11a of the system 10, such as the communal position system (CPS) 10a. As shown in FIG. 7B, TCAS data 122 from the TCAS 120 of the one or more of the proximate vehicles 72 (see FIGS. 4-6B), and the ADS-B data 102 from the ADS-B 100 of the one or more of the proximate vehicles 72 (see FIGS. 4-6B) are transmitted to, and received by, the GPS 86 and the system 10, such as the CPS 10a, comprising the CPS sensor 11a. The GPS data 86a and the CPS position 150 are input to the FMC navigation 82a of the FMC 82. In addition, as further shown in FIG. 7B, DME data 94a from the DME 94 is input to the FMC navigation 82a of the FMC 82, and VOR data 96a from the VOR 96 is input to the FMC navigation 82a of the FMC 82, As further shown in FIG. 7B, navigation solutions 195 result from and are output from the FMC navigation 82a of the FMC 82.

Figure 7C:
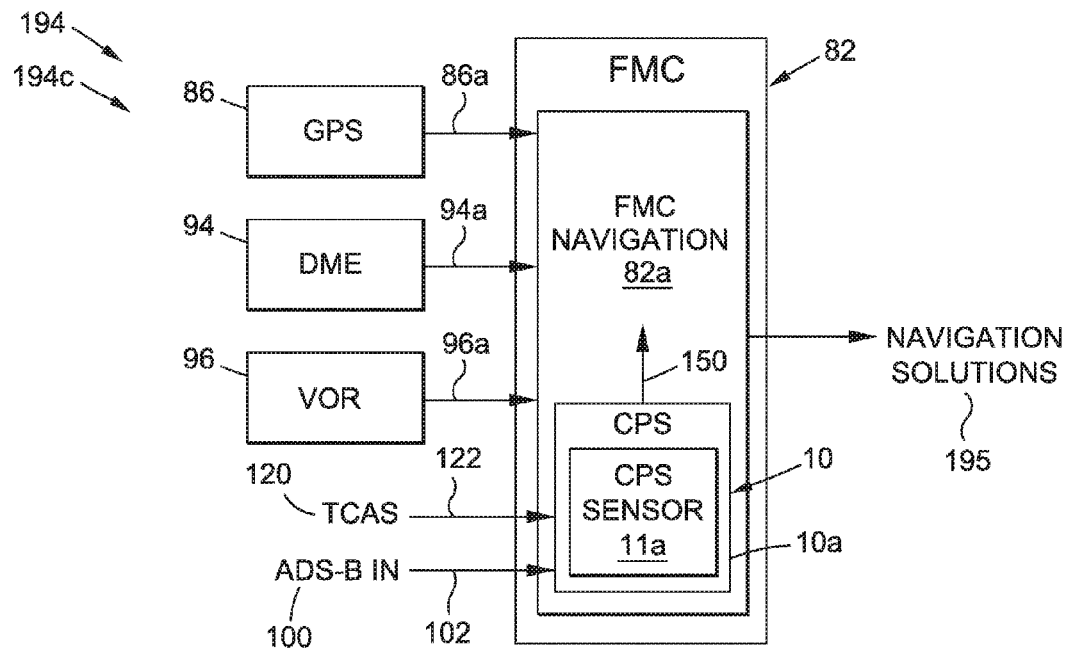
FIG. 7C is schematic diagram of an embodiment of a flight management computer (FMC) integration with the communal position system (CPS) sensor of the disclosure.

Now referring to FIG. 7C, FIG. 7C is a schematic diagram of an embodiment of an integration 194, such as a flight management computer (FMC) integration 194c with the communal position system (CPS) sensor 11a of the system 10, such as the communal position system (CPS) 10a. As shown in FIG. 7C, TCAS data 122 from the TCAS 120 of the one or more of the proximate vehicles 72 (see FIGS. 4-6B), and ADS-B data 102 from the ADS-B 100 of the one or more of the proximate vehicles 72 (see FIGS. 4-6B) are transmitted to, and received by, the system 10, such as the CPS 10a, comprising the CPS sensor 11a, within the FMC navigation 82 of the FMC 82. The CPS position 150 determined in the system 10, such as the CPS 10a, and is output from the CPS 10a to the FMC navigation 82a of the FMC 82. As further shown in FIG. 7C, the GPS data 86a from the GPS 86 is input to the FMC navigation 82a of the FMC 82, the DME data 94a from the DME 94 is input to the FMC navigation 82a of the FMC 82, and the VOR data 96a from the VOR 96 is input to the FMC navigation 82a of the FMC 82, As further shown in FIG. 7C, navigation solutions 195 result from and are output from the FMC navigation 82a of the FMC 82.

Figure 7D:
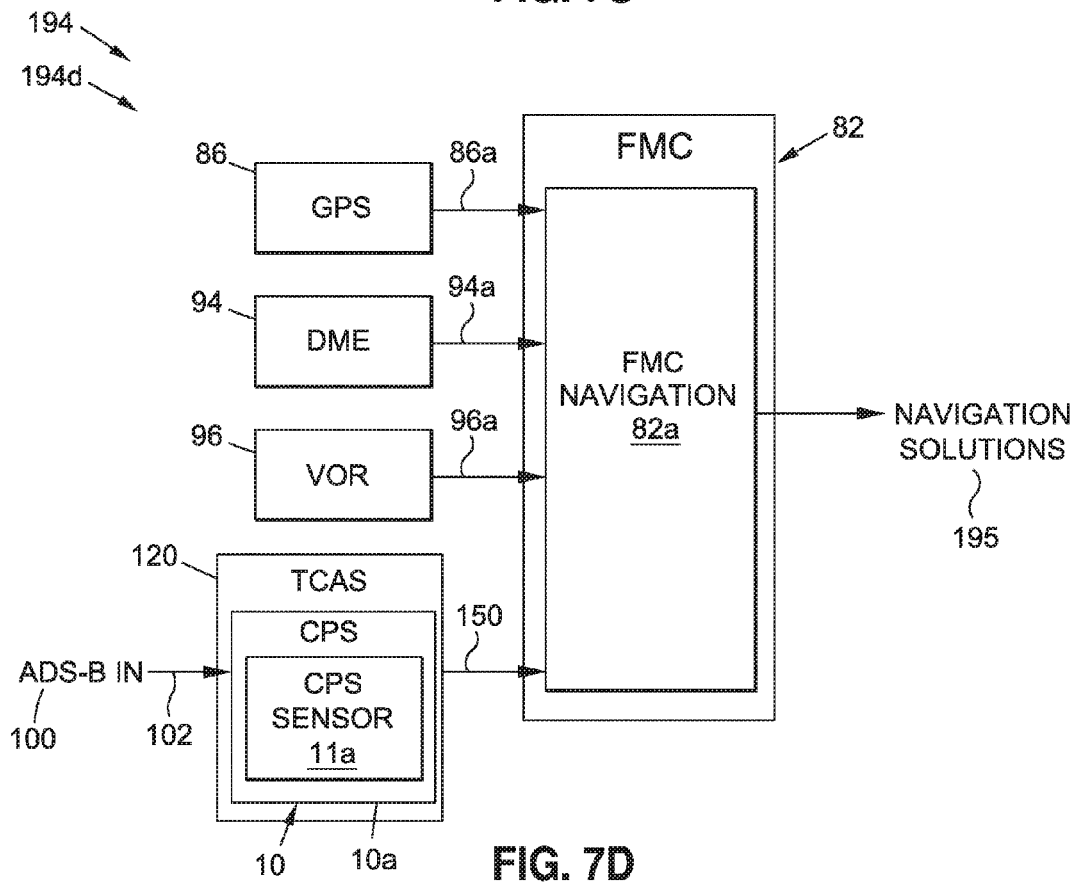
FIG. 7D is schematic diagram of an embodiment of a TCAS integration with the communal position system (CPS) sensor of the disclosure.

Now referring to FIG. 7D, FIG. 7D is a schematic diagram of an embodiment of an integration 194, such as a TCAS integration 194d, with the communal position system (CPS) sensor 11a of the system 10, such as the CPS 10a. As shown in FIG. 7D, the system 10, such as CPS 10a, with the CPS sensor 11a, is hosted in the TCAS 120 with additional input from the ADS-B data 102 from the ADS-B 100, from the one or more of the proximate vehicles 72 (see FIGS. 4-6B), before being used in the FMC navigation 82a of the FMC 82. As further shown in FIG. 7D, the ADS-B data 102 from the ADS-B 100 of the one or more of the proximate vehicles 72 (see FIGS. 4-6B) is transmitted to, and received by, the system 10, such as CPS 10a, comprising the CPS sensor 11a. As further shown in FIG. 7D, the CPS position 150 from the system 10, such as CPS 10a, is output from the CPS 10a to the FMC navigation 82a of the FMC 82. As further shown in FIG. 7D, GPS data 86a from the GPS 86 is input to the FMC navigation 82a of the FMC 82, DME data 94a from the DME 94 is input to the FMC navigation 82a of the FMC 82, and VOR data 96a from the VOR 96 is input to the FMC navigation 82a of the FMC 82. As further shown in FIG. 7D, navigation solutions 195 result from and are output from the FMC navigation 82a of the FMC 82.

Figure 8:
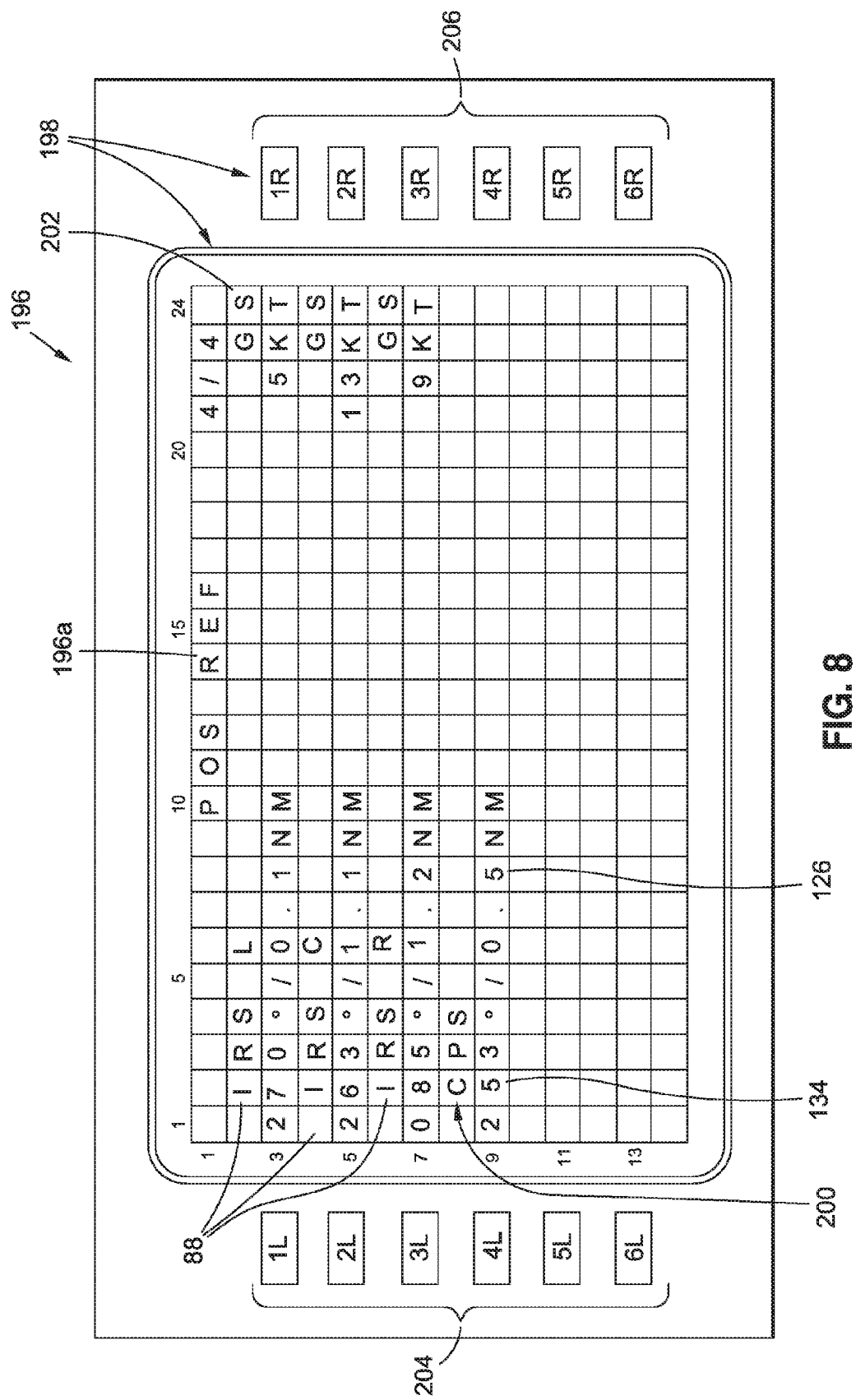
FIG. 8 is an illustration of a cockpit control display unit (CDU) for a position reference CDU that incorporates a communal position system (CPS) display for the communal position system (CPS) of the disclosure.

Now referring to FIG. 8, FIG. 8 is an illustration of a first cockpit control display unit (CDU) 196 for a position reference CDU 196a that incorporates a communal position system (CPS) display 200 for the CPS 10a (see FIG. 4) with the CPS sensor 11a (see FIG. 4) of the disclosure. As shown in FIG. 8, the position reference CDU 196a comprises a user interface 198 showing the CPS display 200 with, for example, a bearing 134 of 253° and a distance 126 of 0.5 NM (nautical miles), with, for example, displays (270°/0.1 NM (nautical miles), 263°/1.1 NM, 85°/1.2 NM) for the inertial reference system (IRS) 88, and with, for example, displays (5 KT (knots), 13 KT, 9 KT) for ground speed (GS) 202. The position reference CDU 196a (see FIG. 8) may be controlled with left controls 204 (see FIG. 8) and right controls 206 (see FIG. 8).

Figure 9:
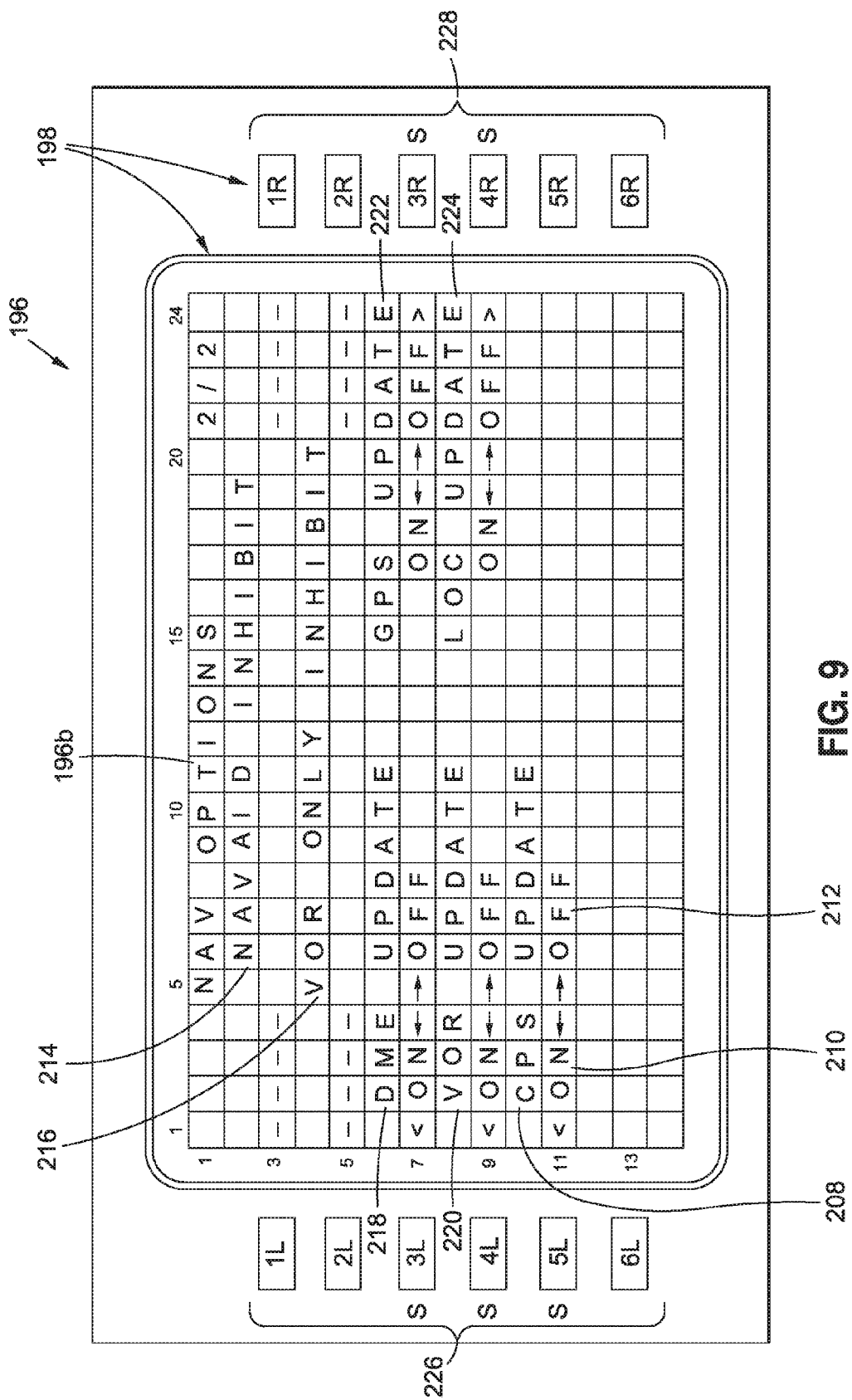
FIG. 9 is an illustration of a cockpit control display unit (CDU) for a navigation options control CDU that incorporates a communal position system (CPS) display for the communal position system (CPS) of the disclosure.

Now referring to FIG. 9, FIG. 9 is an illustration of a second cockpit control display unit (CDU) 197 for a navigation options control CDU 197a that incorporates a CPS display such as a CPS UPDATE display 208, for the CPS 10a (see FIG. 4) with the CPS sensor 11a (see FIG. 4) of the disclosure. As shown in FIG. 9, the navigation options control CDU 197a comprises a user interface 198 showing the CPS UPDATE display 208 with an ON control 210 and an OFF control 212, showing a NAV (navigational) AID INHIBIT display 214, a VOR (very high frequency omnidirectional ranging) ONLY INHIBIT display 216, a DME (distance measuring equipment) UPDATE display 218, a VOR (very high frequency omnidirectional ranging) UPDATE display 220, a GPS (global positioning system) UPDATE display 222, and a LOC (localizer) UPDATE display 224. The navigation options control CDU 197a (see FIG. 9) may be controlled with left controls 226 (see FIG. 9) and right controls 228 (see FIG. 9).

Figure 10:
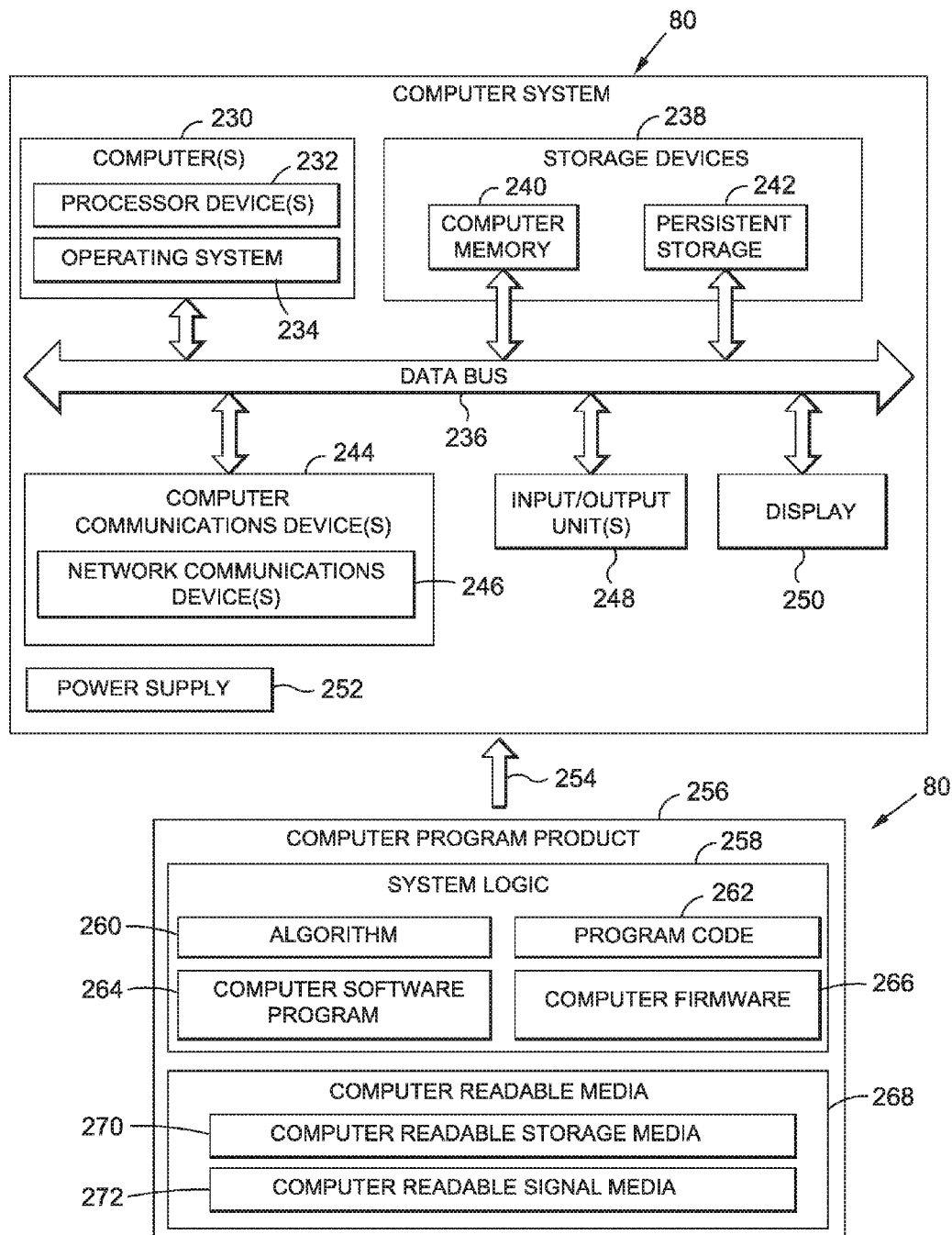
FIG. 10 is an illustration of a functional block diagram showing an exemplary embodiment of a computer system that may be used with one or more embodiments of the system, apparatus, and method of the disclosure.

Now referring to FIG. 10, FIG. 10 is an illustration of a functional block diagram showing an exemplary embodiment of the computer system 80 that may be used in one or more embodiments of the computer implemented system 10 (see FIG. 4), computer implemented apparatus 11 (see FIG. 4), and computer implemented method 280 (see FIG. 11) of the disclosure. As shown in FIG. 10, the computer system 80 comprises one or more computers 230, which may include one or more processor device(s) 232 and an operating system 234. The computer system 80 (see FIG. 10) may be used to implement the one or more computer(s) 230 (see FIG. 10).

The one or more computer(s) 230 (see FIG. 10) or one or more processor device(s) 232 (see FIG. 10) may be configured to control one or more functions of one or more elements of the system 10 (see FIG. 4), such as CPS 10a (see FIG. 4) through computer program instructions, such as computer software 264 (see FIG. 10) stored on a computer memory 240 (see FIG. 10), accessible to the one or more computer(s) 230 (see FIG. 10), or one or more processor device(s) 232 (see FIG. 10).

As shown in FIG. 10, the computer system 80 further comprises a data bus 236 that transfers data between the one or more computers 230, storage devices 238, one or more computer communications devices 244, one or more input/output units 248, and a display 250. The data bus 236 (see FIG. 10) may include hardware components such as wires, optical fibers, and other hardware devices, and may include software components such as communications protocols or other software devices.

As shown in FIG. 10, the computer system 80 further comprises storage devices 238, such as computer memory 240 and persistent storage 242. The computer memory 240 (see FIG. 10) may comprise one or more of a random access memory (RAM), including dynamic and/or static RAM, on-chip or off-chip cache memory, or other suitable computer memory 240 (see FIG. 2). The persistent storage 242 (see FIG. 10) may comprise one or more of a flash memory, a hard drive, Read-Only Memory (ROM), magnetic storage devices such as hard disks, floppy disk drives, and rewritable magnetic tape, rewritable optical disk drives and/or media, non-volatile random access memory (NVRAM), or other suitable persistent storage 242 (see FIG. 10).

As shown in FIG. 10, the computer system 80 may further comprise one or more computer communications device(s) 244, such as one or more networking communications device(s) 247, for linking the computer implemented system 10 (see FIG. 4), for example, to one or more separate systems. The one or more networking communications device(s) 246 (see FIG. 10) may comprise network links between various computers and devices connected together within a network data processing system via wire connections, wireless communication links, fiber optic cables, or other suitable network connections, and that may connect to a network, a server, the Internet, or another system or device.

The one or more computer communications device(s) 244 (see FIG. 10) may be configured to provide for communications in accordance with any of a number of wired or wireless communication standards. The one or more computer(s) 230 (see FIG. 10) or one or more processor device(s) 232 (see FIG. 10) may also be configured to facilitate communications via the one or more computer communications device(s) 244 (see FIG. 10) by, for example, controlling hardware included within the one or more computer communications device(s) 244 (see FIG. 10). The one or more computer communications device(s) 244 (see FIG. 10) may include, for example, one or more antennas, a transmitter, a receiver, a transceiver and/or supporting hardware, including, for example, a processor for enabling communications.

As shown in FIG. 10, the computer system 80 further comprises one or more input/output unit(s) 248, a display 250, and a power supply 252. The one or more input/output unit(s) 248 (see FIG. 10) provide for the input and output of data with other devices connected to the computer system 80 (see FIG. 10), such as computer interfaces. The one or more input/output unit(s) 248 (see FIG. 10) may comprise such devices as a keyboard, a mouse, a joystick, or other input/output devices. For example, the one or more input/output unit(s) 248 (see FIG. 10) may provide a connection for user input though a keyboard and mouse, or may send output to a printer or other device.

The display 250 (see FIG. 10) provides the means to display data or information to a user such as a pilot, one or more separate automated systems, automated computer programs, automated apparatuses, or automated devices, or another suitable separate system, program, or device. The power supply 252 (see FIG. 10) of the computer system 80 (see FIG. 10) may comprise batteries, electricity, or other power supply elements.

As shown in FIG. 10, a computer program product 256 may be used in the computer system 80 by loading the computer program product 256 into the computer system 80 via a loading mechanism 254 or other suitable mechanism. The computer program product 256 (see FIG. 10) may comprise a system logic 258 (see FIG. 10). As shown in FIG. 10, the system logic 258 may comprise an algorithm 260, a program code 262, a computer software 264, a computer firmware 266, or another suitable system logic 258. As shown in FIG. 10, the computer program product 256 may comprise a computer readable medium 268. The computer readable medium 268 (see FIG. 10) may comprise a computer readable storage media 270 (see FIG. 10), a computer readable signal media 272 (see FIG. 10), or another suitable computer readable medium 268 (see FIG. 10).

The system logic 258 (see FIG. 10), such as the algorithm 260 (see FIG. 10), the program code 262 (see FIG. 10), the computer software 264 (see FIG. 10), the computer firmware 266 (see FIG. 10), or another suitable system logic 258 (see FIG. 10), may be stored in and retrieved from the computer readable storage media 270 (see FIG. 10) and loaded into the one or more computer(s) 230 (see FIG. 10), the one or more processor device(s) 232, or other programmable device, to configure and direct the one or more computer(s) 230, the one or more processor device(s) 232, or other programmable device to execute operations to be performed on or by the one or more computer(s) 230, the one or more processor device(s) 232, or other programmable device, and to function in a particular way to generate a particular apparatus or article of manufacture. Execution of the system logic 258 (see FIG. 10), such as the algorithm 260 (see FIG. 10), the program code 262 (see FIG. 10), the computer software 264 (see FIG. 10), the computer firmware 266 (see FIG. 10), or another suitable system logic 258 (see FIG. 10), may produce a computer-implemented system, process or method, such that the system logic 258 (see FIG. 10), such as the algorithm 260 (see FIG. 10), the program code 262 (see FIG. 10), the computer software 264 (see FIG. 10), the computer firmware 266 (see FIG. 10), or another suitable system logic 258 (see FIG. 10), executed by the one or more computer(s) 230 (see FIG. 10), one or more processor device(s) 232 (see FIG. 10), or other programmable device, provide operations for implementing the functions disclosed herein.

Figure 11:
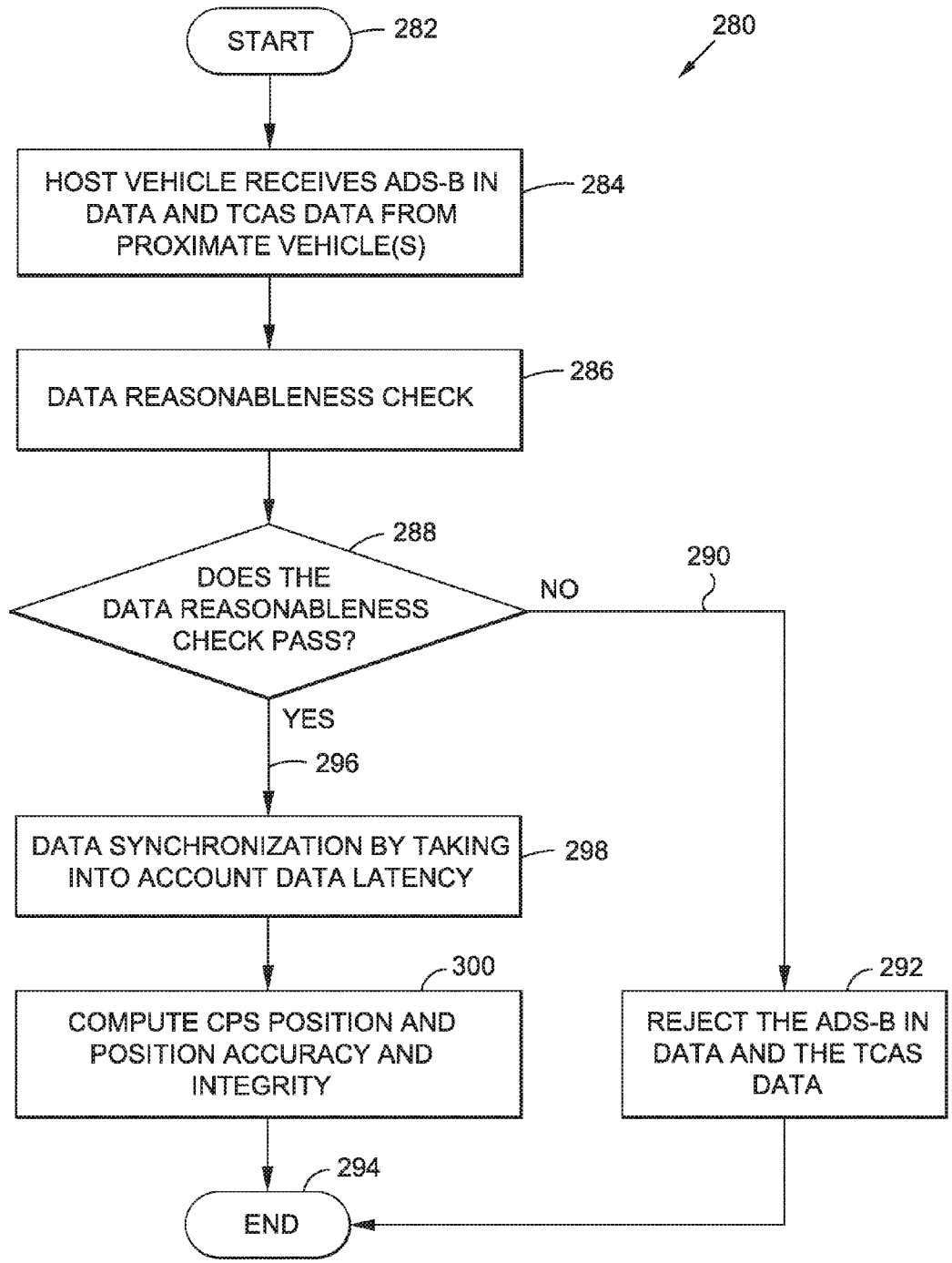
FIG. 11 is an illustration of a flow diagram showing an embodiment of a method of the disclosure.

Now referring to FIG. 11, in another embodiment of the disclosure, there is provided a computer implemented method 280 for using automatic dependent surveillance-broadcast (ADS-B) data 102 (see FIG. 4) and traffic alert and collision avoidance system (TCAS) data 122 (see FIG. 4) for determining one or more navigation solutions 195 (see FIG. 4) for a vehicle 12 (see FIG. 4). FIG. 11 is an illustration of a flow diagram showing an embodiment of the method 280 of the disclosure. The method 280 may be performed in one of, an air-based location 64 (see FIG. 4), and a ground-based location 190 (see FIG. 4).

FIG. 11 shows a START step 282. FIG. 11 further shows step 284 of receiving, by a communal position system (CPS) 10a (see FIG. 4) in the vehicle 12 (see FIG. 4), preferably comprising a host vehicle 70 (see FIG. 4), automatic dependent surveillance-broadcast (ADS-B) data 102 (see FIG. 4) and traffic alert and collision avoidance system (TCAS) data 122 (see FIG. 4) from one or more proximate vehicles 72. The ADS-B data 102 is preferably received from each of one or more proximate vehicles 72 (see FIG. 4) in proximity to the host vehicle 70, through an automatic dependent surveillance-broadcast (ADS-B) 100 (see FIG. 4). The TCAS data 122 (see FIG. 4) is preferably received from each of the one or more proximate vehicles 72, through a traffic alert and collision avoidance system (TCAS) 120 (see FIG. 4).

In the receiving 284 step (see FIG. 11), the receiving the ADS-B data 102 from each of the one or more proximate vehicles 72 comprises receiving the ADS-B data 102 comprising one or more of, identification information 104 (see FIG. 4) for each proximate vehicle 72, a latitude 106 (see FIG. 4) for each proximate vehicle 72, a longitude 108 (see FIG. 4) for each proximate vehicle 72, a position navigation integrity category (NIC) 110 (see FIG. 4) for each proximate vehicle 72, a barometric altitude 112 (see FIG. 4) for each proximate vehicle 72, a global navigation satellite system (GNSS) height 114 (see FIG. 4) for each proximate vehicle 72, a plurality of velocities 116 (see FIG. 4) for each proximate vehicle 72, and a navigation accuracy category for velocity (NACv) 118 (see FIG. 4) for each proximate vehicle 72. In the receiving 284 step, the TCAS data 122 from each of the one or more proximate vehicles 72 comprises receiving the TCAS data 122 comprising one or more of, identification information 104 (see FIG. 4) for each proximate vehicle 72, a slant range 128 (see FIG. 4) for each proximate vehicle 72, a bearing 134 (see FIG. 4) for each proximate vehicle 72, and a relative altitude 124 (see FIG. 4) for each proximate vehicle 72.

In one embodiment, the receiving 284 by the host vehicle 70, of the ADS-B data 102 and the TCAS data 122, comprises receiving the ADS-B data 102 and the TCAS data 122 from one proximate vehicle 72 having TCAS data 122 comprising a slant range 128, a bearing 134, and a relative altitude 124, and having ADS-B data 102 comprising a latitude 106, a longitude 108, and a barometric altitude 112. In another embodiment, the receiving 284 by the host vehicle 70, of the ADS-B data 102 and the TCAS data 122, comprises receiving the ADS-B data 102 and the TCAS data 122 from multiple proximate vehicles 72, for example, three proximate vehicles 72 (see FIG. 6A), each proximate vehicle having TCAS data 122 comprising a slant range 128, and having ADS-B data 102 comprising a latitude 106, a longitude 108, and a barometric altitude 112.

As shown in FIG. 11, the method 280 further comprises step 286 of conducting a data reasonableness 152 (see FIG. 4) check of the ADS-B data 102 and the TCAS data 122 using a computer system 80 (see FIG. 4) coupled to the CPS 10a (see FIG. 4). The computer system 80 (see FIGS. 4, 10) preferably comprises at least one computer 230 (see FIG. 10) and a processor device 232 (see FIG. 10) for executing one or more functions of the at least one computer 230. The computer system 80 (see FIG. 10) further preferably comprises a computer software program 264 (see FIG. 10) adapted to perform via the computer 230 and the processor device 232, the data reasonableness 152 (see FIG. 4) check. In the conducting 286 step, the data reasonableness 152 (see FIG. 4) check of the ADS-B data 102 and the TCAS data 122 comprises checking the data reasonableness 152 (see FIG. 4) for the slant range 128 and the bearing 134 using a last known position 158 (see FIG. 4) of each of the one or more proximate vehicles 72 propagated to real-time 156 (see FIG. 4) and the ADS-B data 102 (see FIG. 4).

As shown in FIG. 11, the method 280 further comprises step 288 of asking the question of, "Does the data reasonableness 152 check pass"? As shown in FIG. 11, if a "NO" answer 290 is the answer to the question in step 288, then the method 280 proceeds to step 292, where the ADS-B data 102 and the TCAS data 122 are rejected, if the data reasonableness 152 check does not pass.

As shown in FIG. 11, if a "YES" answer 296 is the answer to the question in step 288, then the method 280 proceeds to step 298. As shown in FIG. 11, step 298 comprises performing, with the computer system 80 (see FIG. 10), preferably comprising at least one computer 230 (see FIG. 10) and the processor device 232 (see FIG. 10) and the computer software program 264 (see FIG. 10), a data synchronization 140 (see FIG. 4) of the ADS-B data 102 (see FIG. 4) and the TCAS data 122 (see FIG. 4), if the data reasonableness 152 (see FIG. 4) check passes. The data synchronization 140 (see FIG. 4) takes into account a data latency 142 (see FIG. 4) due to a transmission 144 (see FIG. 4) and a computation 146 (see FIG. 4) of the ADS-B data 102 and the TCAS data 122.

As shown in FIG. 11, the method 280 further comprises step 300 of computing, with the computer system 80 (see FIG. 10), preferably comprising at least one computer 230 (see FIG. 10) and the processor device 232 (see FIG. 10) and the computer software program 264 (see FIG. 10), a communal position system (CPS) position 150 (see FIG. 4) and a position accuracy 170 (see FIG. 4) based on the ADS-B data 102 (see FIG. 4) and the TCAS data 122 (see FIG. 4), and determining one or more navigation solutions 195 (see FIG. 4) for the vehicle 12 (see FIG. 4). The one or more navigation solutions 195 (see FIG. 4) comprise one or more of, an alternate navigation solution 195a (see FIG. 4), an independent navigation solution 195b (see FIG. 4), and a complementary navigation solution 195c (see FIG. 4).

The method 280 may further comprise integrating the CPS 10a (see FIG. 4) in one of, a flight management computer (FMC) 82 (see FIGS. 4, 7C) in the host vehicle 70, a global positioning system (GPS) 86 (see FIGS. 4, 7B) in the host vehicle 70, and a traffic alert and collision avoidance system (TCAS) 120 (see FIGS. 4, 7D) in the host vehicle 70.

Disclosed embodiments of the system 10 (see FIG. 4) such as the CPS 10a (see FIG. 4), the apparatus 11 (see FIG. 4) such as the CPS sensor 11a (see FIG. 4), and the method 280 (see FIG. 11) provide an innovative way to determine vehicle 12 (see FIG. 4), such as aircraft 12b (see FIG. 4), navigation solutions 195 (see FIG. 4) by using automatic dependent surveillance-broadcast (ADS-B) data 102 (see FIG. 4) and traffic alert and collision avoidance system (TCAS) data 122 (see FIG. 4). By using bearings 134 (see FIG. 4) and distances 126 (see FIG. 4) from one or more proximate vehicles 72 (see FIGS. 4-6B) through TCAS 120 (see FIG. 4), and the navigation positions 73 from the one or more proximate vehicles 72 (see FIGS. 4-6B) through ADS-B 100 (see FIG. 4), a CPS position 150 (see FIG. 4) and a navigation position 71 (see FIG. 4) of the host vehicle 70 (see FIG. 4) may be computed in an air environment 62 (see FIG. 4) or on a ground environment 188 (see FIG. 4). Further, disclosed embodiments of the system 10 (see FIG. 4) such as the CPS 10a (see FIG. 4), the apparatus 11 (see FIG. 4) such as the CPS sensor 11a (see FIG. 4), and the method 280 (see FIG. 11) provide an alternate navigation solution 195a (see FIG. 4), if a position solution using existing techniques is not available, or one or more position sensors 84 (see FIG. 4) onboard the vehicle 12 (see FIG. 4) become non-operational or fail. For example, disclosed embodiments of the system 10 (see FIG. 4) such as the CPS 10a (see FIG. 4), the apparatus 11 (see FIG. 4) such as the CPS sensor 11a (see FIG. 4), and the method 280 (see FIG. 11) may solve various issues and provide an alternate navigation solution 195a (see FIG. 4), when the global navigation satellite system (GNSS) data 90a (see FIG. 11) is lost due to GNSS 90 (see FIG. 4) receiver failures, or signal jamming 66a (see FIG. 4) of GPS 86 (see FIG. 4), provided the ADS-B data 102 from the one or more proximate vehicles 72 (see FIG. 4) is not affected by the signal jamming 66a (see FIG. 4). Further, disclosed embodiments of the system 10 (see FIG. 4) such as the CPS 10a (see FIG. 4), the apparatus 11 (see FIG. 4) such as the CPS sensor 11a (see FIG. 4), and the method 280 (see FIG. 11) provide an independent navigation solution 195b (see FIG. 4) for cross-checking 184 (see FIG. 4) and integrity monitoring 186 (see FIG. 4) of other position solutions, e.g., FMC 82 (see FIG. 4) or GPS 86 (see FIG. 4) positions.

Moreover, disclosed embodiments of the system 10 (see FIG. 4) such as the CPS 10a (see FIG. 4), the apparatus 11 (see FIG. 4) such as the CPS sensor 11a (see FIG. 4), and the method 280 (see FIG. 11) provide a complementary navigation solution 195c for integrating with existing or known position sensors 84 (see FIG. 4). The ADS-B data 102 (see FIG. 4) and the TCAS data 122 (see FIG. 4) from proximate vehicles 72 (see FIG. 4) may be integrated into a GPS 86 (see FIG. 4) receiver. The proximate vehicles 72 (see FIG. 4) may be treated as additional satellites 274 (see FIG. 4), which provide additional range measurements 276 (see FIG. 4), and which may be weighted based on known position accuracy 170 (see FIG. 4), which, in turn, may be used to improve a satellite-receiver geometry 278 (see FIG. 4), especially in a vertical dilution of precision (VDOP) 180 (see FIG. 4), if one or more of the proximate vehicles 72 (see FIGS. 4-6B) is/are below the host vehicle 70 (see FIGS. 4-6B). Thus, the CPS 10a and the CPS sensor 11a may be integrated with existing or known position sensors 84 (see FIG. 4). Similarly, the slant ranges 128 (see FIG. 4) and distances 126 (see FIG. 4) or bearings 134 (see FIG. 4) of the one or more the proximate vehicles 72 (see FIGS. 4-6B) may be integrated into the FMC 82 (see FIGS. 7A-7D) with existing IRS 88 (see FIG. 4) position sensors and/or radio position sensors 92 (see FIG. 4) using the Kalman filter 182 (see FIG. 4).

In addition, disclosed embodiments of the system 10 (see FIG. 4) such as the CPS 10a (see FIG. 4), the apparatus 11 (see FIG. 4) such as the CPS sensor 11a (see FIG. 4), and the method 280 (see FIG. 11) may reduce navigation sensor installation costs associated with operating a group of air vehicles 12a (see FIG. 4), including unmanned air vehicles 12c (see FIG. 4), as the use of the CPS 10a with the CPS sensor 11a (see FIG. 4) may eliminate the need for all of the air vehicles 12a (see FIG. 4) in the group to have position sensors 84 (see FIG. 4), such as IRS 88 (see FIG. 4) sensors, GNSS 90 (see FIG. 4) sensors, and radio position sensors 92 (see FIG. 4). If a small subset of air vehicles 12a, referred to as leaders 70b (see FIG. 4) have the positions sensors 84 (see FIG. 4), the remaining air vehicles 12a, referred to as workers 72e (see FIG. 4), may be able to compute their independent navigation solutions using only their ADS-B 100 and TCAS 120. Not having to equip and install known onboard position sensors into all of the air vehicles 12 in the group may thus decrease the costs, installation time, and labor to install. Moreover, different operational objectives may also be accommodated, where the leader 70b (see FIG. 4) may be located either on the ground or in the air, with the workers 72e (see FIG. 4).

Further, disclosed embodiments of the system 10 (see FIG. 4) such as the CPS 10a (see FIG. 4), the apparatus 11 (see FIG. 4) such as the CPS sensor 11a (see FIG. 4), and the method 280 (see FIG. 11) provide a communal position navigation solution that uses ADS-B data 102 and TCAS data 122 from nearby or proximate air vehicles 72 to compute a navigation position 71 of a host vehicle 70 should one or more position sensors 84 become nonoperational onboard the host vehicle 70 or should the host vehicle 70 experience signal jamming 66a (see FIG. 4). The use of disclosed embodiments of the system 10 (see FIG. 4) such as the CPS 10a (see FIG. 4), the apparatus 11 (see FIG. 4) such as the CPS sensor 11a (see FIG. 4), and the method 280 (see FIG. 11) in vehicles 12 may result in an overall cost savings and cost avoidance.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:
1. A system using automatic dependent surveillance-broadcast (ADS-B) data and traffic alert and collision avoidance system (TCAS) data for determining one or more navigation solutions for a vehicle, the system comprising:
  a communal position system (CPS) comprising:
   a communal position system (CPS) sensor located in the vehicle, the CPS sensor configured to receive automatic dependent surveillance-broadcast (ADS-B) data and traffic alert and collision avoidance system (TCAS) data from each of one or more proximate vehicles, wherein the ADS-B data comprises a latitude, a longitude, and a barometric altitude for each proximate vehicle, and wherein the TCAS data comprises one of, a slant range for each proximate vehicle, or a slant range, a bearing, and a relative altitude for each proximate vehicle;
  a computer system coupled to the CPS, the computer system configured to perform the steps of:
   checking the ADS-B data and the TCAS data for data reasonableness;
   performing data synchronization of the ADS-B data and the TCAS data; and
   computing a communal position system (CPS) position and a position accuracy based on the ADS-B data and the TCAS data,
  wherein the CPS is used in determining one or more navigation solutions for the vehicle, the one or more navigation solutions comprising one or more of, an alternate navigation solution, an independent navigation solution, and a complementary navigation solution.

2. The system of claim 1 wherein the CPS is integrated in one of, a flight management computer (FMC) in the vehicle, a global positioning system (GPS) in the vehicle, and a traffic alert and collision avoidance system (TCAS) in the vehicle.

3. The system of claim 1 wherein the automatic dependent surveillance-broadcast (ADS-B) data for each of the one or more proximate vehicles further comprises one or more of, identification information for each proximate vehicle, a position navigation integrity category (NIC) for each proximate vehicle, a global navigation satellite system (GNSS) height for each proximate vehicle, a plurality of velocities for each proximate vehicle, and a navigation accuracy category for velocity (NACv) for each proximate vehicle.

4. The system of claim 1 wherein the traffic alert and collision avoidance system (TCAS) data for each of the one or more proximate vehicles further comprises identification information for each proximate vehicle.

5. The system of claim 1 wherein the data reasonableness for the slant range and the bearing is checked using a last known position of each of the one or more proximate vehicles propagated to real-time and the ADS-B data.

6. The system of claim 1 wherein the data synchronization takes into account a data latency due to a transmission and a computation of the ADS-B data and the TCAS data.

7. The system of claim 1 wherein the alternate navigation solution is used when one or more position sensors on the vehicle experiences one of, being non-operational, signal jamming, and interference.

8. The system of claim 1 wherein the independent navigation solution is used for cross-checking and integrity monitoring of one or more position sensors on the vehicle.

9. The system of claim 1 wherein the complementary navigation solution is used when the ADS-B data and the TCAS data from the one or more proximate vehicles is integrated into a global positioning system (GPS), and the one or more proximate vehicles function as additional satellites providing additional range measurements, to improve a satellite-receiver geometry.

10. The system of claim 1 wherein the vehicle is a host vehicle comprising an air vehicle, including one of, an aircraft, an unmanned air vehicle, a satellite, a glider, a rotorcraft, and a missile.

11. An apparatus for using automatic dependent surveillance-broadcast (ADS-B) data and traffic alert and collision avoidance system (TCAS) data for determining one or more navigation solutions for a vehicle, the apparatus comprising:
a communal position system (CPS) sensor located in the vehicle, the CPS sensor configured to receive automatic dependent surveillance-broadcast (ADS-B) data and traffic alert and collision avoidance system (TCAS) data from each of one or more proximate vehicles, wherein the ADS-B data comprises a latitude, a longitude, and a barometric altitude for each proximate vehicle, and wherein the TCAS data comprises one of, a slant range for each proximate vehicle, or a slant range, a bearing, and a relative altitude for each proximate vehicle, and the CPS sensor being used to determine one or more navigation solutions for the vehicle, the one or more navigation solutions comprising one or more of, an alternate navigation solution, an independent navigation solution, and a complementary navigation solution, wherein the CPS sensor is coupled to a computer system configured to perform the steps of:
checking the ADS-B data and the TCAS data for data reasonableness;
performing data synchronization of the ADS-B data and the TCAS data; and
computing a communal position system (CPS) position and a position accuracy based on the ADS-B data and the TCAS data.

12. The apparatus of claim 11 wherein the CPS sensor is integrated in one of, a flight management computer (FMC) in the vehicle, a global positioning system (GPS) in the vehicle, and a traffic alert and collision avoidance system (TCAS) in the vehicle.

13. The apparatus of claim 11 wherein the CPS sensor receives ADS-B data further comprising one or more of, identification information for each proximate vehicle, a position navigation integrity category (NIC) for each proximate vehicle, a global navigation satellite system (GNSS) height for each proximate vehicle, a plurality of velocities for each proximate vehicle, and a navigation accuracy category for velocity (NACv) for each proximate vehicle, and wherein the CPS sensor receives TCAS data further comprising identification information for each proximate vehicle.

14. A computer implemented method for using automatic dependent surveillance-broadcast (ADS-B) data and traffic alert and collision avoidance system (TCAS) data for determining one or more navigation solutions for a vehicle, the method comprising the steps of:
receiving, by a communal position system (CPS) in the vehicle, automatic dependent surveillance-broadcast (ADS-B) data and traffic alert and collision avoidance system (TCAS) data, from each of one or more proximate vehicles, wherein the ADS-B data comprises a latitude, a longitude, and a barometric altitude for each proximate vehicle, and wherein the TCAS data comprises one of, a slant range for each proximate vehicle, or a slant range, a bearing, and a relative altitude for each proximate vehicle;
conducting a data reasonableness check of the ADS-B data and the TCAS data using a computer system coupled to the CPS;
rejecting the ADS-B data and the TCAS data, if the data reasonableness check does not pass;
performing, with the computer system, a data synchronization of the ADS-B data and the TCAS data, if the data reasonableness check passes, the data synchronization taking into account a data latency due to a transmission and a computation of the ADS-B data and the TCAS data; and
computing, with the computer system, a communal position system (CPS) position and a position accuracy based on the ADS-B data and the TCAS data, and determining one or more navigation solutions for the vehicle, the one or more navigation solutions comprising one or more of, an alternate navigation solution, an independent navigation solution, and a complementary navigation solution.

15. The method of claim 14 further comprising integrating the CPS in one of, a flight management computer (FMC) in the vehicle, a global positioning system (GPS) in the vehicle, and a traffic alert and collision avoidance system (TCAS) in the vehicle.

16. The method of claim 14 wherein the receiving the ADS-B data from each of the one or more proximate vehicles comprises receiving the ADS-B data further comprising one or more of, identification information for each proximate vehicle, a position navigation integrity category (NIC) for each proximate vehicle, a global navigation satellite system (GNSS) height for each proximate vehicle, a plurality of velocities for each proximate vehicle, and a navigation accuracy category for velocity (NACv) for each proximate vehicle.

17. The method of claim 14 wherein the receiving the TCAS data from each of the one or more proximate vehicles comprises receiving the TCAS data further comprising identification information for each proximate vehicle.

18. The method of claim 14 wherein conducting the data reasonableness check of the ADS-B data and the TCAS data comprises checking the data reasonableness for the slant range and the bearing using a last known position of each of the one or more proximate vehicles propagated to real-time and the ADS-B data.

19. The method of claim 14 wherein the receiving by the vehicle, of the ADS-B data and the TCAS data, comprises receiving the ADS-B data and the TCAS data from one proximate vehicle having TCAS data comprising the slant range, the bearing, and the relative altitude, and having ADS-B data comprising the latitude, the longitude, and the barometric altitude.

20. The method of claim 14 wherein the receiving by the vehicle, of the ADS-B data and the TCAS data, comprises receiving the ADS-B data and the TCAS data from three proximate vehicles, each proximate vehicle having TCAS data comprising the slant range, and having ADS-B data comprising the latitude, the longitude, and the barometric altitude.

21. The method of claim 14 wherein the method is performed in one of, an air-based location, and a ground-based location.

* * * * *